United States Patent
Majewski et al.

(10) Patent No.: US 12,327,149 B2
(45) Date of Patent: Jun. 10, 2025

(54) EDGE CONTROLLER FOR A FACILITY

(71) Applicant: Honeywell International Inc., Charlotte, NC (US)

(72) Inventors: Joseph Majewski, Huntington, NY (US); Ivan Rares, Charlotte, NC (US); Daniel Giorgis, Glen Allen, VA (US); Robin Wilderson, Charlotte, NC (US); Rod Stein, Edmonton (CA); Robert E. Flasher, Charlotte, NC (US); Srinivasa Rangan, Charlotte, NC (US); Raymond A. Richards, Charlotte, NC (US); Amod Kamat, Charlotte, NC (US); Upender Paravastu, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 843 days.

(21) Appl. No.: 17/346,809

(22) Filed: Jun. 14, 2021

(65) Prior Publication Data
US 2021/0389968 A1    Dec. 16, 2021

Related U.S. Application Data

(60) Provisional application No. 63/143,633, filed on Jan. 29, 2021, provisional application No. 63/039,300, filed on Jun. 15, 2020.

(51) Int. Cl.
*G06F 9/54* (2006.01)
*G06F 9/455* (2018.01)
(Continued)

(52) U.S. Cl.
CPC ............ *G06F 9/54* (2013.01); *G06F 9/45558* (2013.01); *G06F 9/5072* (2013.01); *G06F 9/541* (2013.01);
(Continued)

(58) Field of Classification Search
None
See application file for complete search history.

(56) References Cited

U.S. PATENT DOCUMENTS

| 5,249,270 A | 9/1993 | Stewart et al. |
| 5,297,257 A | 3/1994 | Struger et al. |

(Continued)

FOREIGN PATENT DOCUMENTS

| CA | 2900767 A1 | 8/2014 |
| CN | 103679304 A | 3/2014 |

(Continued)

OTHER PUBLICATIONS

Yang et al., "Big Data Driven Edge-Cloud Collaboration Architecture for Cloud Manufacturing: A Software Defined Perspective", Feb. 7, 2020, IEEE Access, vol. 8, 2020. (Year: 2020).*

(Continued)

*Primary Examiner* — Qing Yuan Wu
(74) *Attorney, Agent, or Firm* — Seager, Tufte & Wickhem, LLP

(57) ABSTRACT

An edge controller may be used for obtaining device data from one or more local devices at a local facility and to provide a representation of at least some of the device data to a remote server. The edge controller may include a network communication port, a cellular communication port and a device communication port. A controller is operatively coupled to the network communication port, the cellular communication port and the device communication port and is configured to receive configuration information and to install the received configuration information on the edge controller. The installed configuration information configures the controller to obtain the device data from the one or more local devices and to send a representation of at least some of the device data to the remote server.

15 Claims, 25 Drawing Sheets

(51) Int. Cl.
*G06F 9/50* (2006.01)
*H04L 12/28* (2006.01)
*H04W 84/02* (2009.01)

(52) U.S. Cl.
CPC ......... *H04L 12/2823* (2013.01); *H04W 84/02* (2013.01); *G06F 2009/45562* (2013.01); *G06F 2009/4557* (2013.01); *G06F 2009/45575* (2013.01); *G06F 2009/45595* (2013.01)

(56) References Cited

U.S. PATENT DOCUMENTS

| | | |
|---|---|---|
| 5,398,336 A | 3/1995 | Tantry et al. |
| 5,550,980 A | 8/1996 | Pascucci et al. |
| 5,598,566 A | 1/1997 | Pascucci et al. |
| 5,718,767 A | 2/1998 | Crum et al. |
| 5,805,442 A | 9/1998 | Crater et al. |
| 5,862,052 A | 1/1999 | Nixon et al. |
| 6,047,222 A | 4/2000 | Burns et al. |
| 6,067,477 A | 5/2000 | Wewalaarachchi et al. |
| 6,119,125 A | 9/2000 | Gloudeman et al. |
| 6,157,943 A | 12/2000 | Meyer |
| 6,189,109 B1 | 2/2001 | Sheikh et al. |
| 6,370,448 B1 | 4/2002 | Eryurek |
| 6,832,120 B1 | 12/2004 | Frank et al. |
| 7,240,106 B2 | 7/2007 | Cochran et al. |
| 7,424,701 B2 | 9/2008 | Kendall et al. |
| 8,046,320 B2 | 10/2011 | De |
| 8,145,333 B2 | 3/2012 | Vrba et al. |
| 8,290,627 B2 | 10/2012 | Richards et al. |
| 8,515,736 B1 | 8/2013 | Duta |
| 8,595,245 B2 | 11/2013 | Cavestro et al. |
| 9,020,879 B2 | 4/2015 | Mcclung et al. |
| 9,081,847 B2 | 7/2015 | Casella Dos Santos et al. |
| 9,128,472 B2 | 9/2015 | Lawson et al. |
| 9,239,872 B2 | 1/2016 | Casella Dos Santos et al. |
| 9,253,054 B2 | 2/2016 | Maturana et al. |
| 9,363,336 B2 | 6/2016 | Lawson et al. |
| 9,413,852 B2 | 8/2016 | Lawson et al. |
| 9,477,936 B2 | 10/2016 | Lawson et al. |
| 9,535,411 B2 | 1/2017 | Wei et al. |
| 9,565,275 B2 | 2/2017 | Awson et al. |
| 9,568,908 B2 | 2/2017 | Lawson et al. |
| 9,568,909 B2 | 2/2017 | Lawson et al. |
| 9,965,562 B2 | 5/2018 | Lawson et al. |
| 10,095,207 B2 | 10/2018 | Ji et al. |
| 10,116,532 B2 | 10/2018 | Lawson et al. |
| 10,139,811 B2 | 11/2018 | Lawson et al. |
| 10,401,810 B2 | 9/2019 | Guthrie et al. |
| 10,443,357 B2 | 10/2019 | Weatherhead et al. |
| 10,643,136 B2 | 5/2020 | Sublett |
| 2002/0194223 A1 | 12/2002 | Meyers et al. |
| 2006/0020465 A1 | 1/2006 | Cousineau et al. |
| 2011/0035352 A1 | 2/2011 | Hale et al. |
| 2011/0118896 A1 | 5/2011 | Holloway |
| 2011/0246530 A1 | 10/2011 | Malafsky |
| 2011/0295790 A1 | 12/2011 | Zillner |
| 2012/0194502 A1 | 8/2012 | Smith et al. |
| 2013/0104244 A1 | 4/2013 | Qu et al. |
| 2013/0211870 A1 | 8/2013 | Lawson et al. |
| 2013/0212214 A1 | 8/2013 | Lawson et al. |
| 2013/0275448 A1 | 10/2013 | Mirhaji |
| 2014/0012950 A1 | 1/2014 | Doucette et al. |
| 2014/0032555 A1 | 1/2014 | Kiff et al. |
| 2014/0375431 A1 | 12/2014 | Cristache |
| 2017/0223110 A1 | 8/2017 | Lawson et al. |
| 2018/0309818 A1 | 10/2018 | Park et al. |
| 2018/0356800 A1 | 12/2018 | Chao et al. |
| 2019/0014180 A1 | 1/2019 | Lawson et al. |
| 2019/0094827 A1 | 3/2019 | Park et al. |
| 2019/0369984 A1 | 12/2019 | Malladi et al. |
| 2020/0003028 A1 | 1/2020 | Weatherhead et al. |
| 2020/0175105 A1 | 6/2020 | Falk et al. |

FOREIGN PATENT DOCUMENTS

| | | |
|---|---|---|
| CN | 104969133 A | 10/2015 |
| EP | 2660667 A2 | 11/2013 |
| EP | 2801935 A1 | 11/2014 |
| EP | 2954377 A1 | 12/2015 |
| EP | 3070548 A2 | 9/2016 |
| JP | 2017103981 A | 6/2017 |
| JP | 2018534651 A | 11/2018 |
| MX | 343533 B | 11/2016 |
| WO | 2013133967 A1 | 9/2013 |
| WO | 2014124353 A1 | 8/2014 |
| WO | 2016050257 A1 | 4/2016 |
| WO | 2017213771 A1 | 12/2017 |
| WO | 2018234741 A1 | 12/2018 |
| WO | 2020097221 A1 | 5/2020 |

OTHER PUBLICATIONS

Zhang et al; "An OWL/SWRL based diagnosis approach in a pervasive middleware", 20th International Conference on Software Engineering and Knowledge Engineering; 2008, 6 pages. (Year: 2008).

"Pelion: a Flexible, Secure and Efficient IoT Platform—Arm®—Arm," 13 pages, https://www.arm.com/products/iot/pelion-iot-platform accessed Jun. 15, 2020.

Byron et al; http://ww.coative.com/pages.wp9605lu.html, "A Technology Roadmap for Enterprise Connectivity to Control Networks", Coactive White Papers, Nov. 5, 1998, pp. 1-13.

International Search Repost and Written Opinion dated Aug. 27, 2021 for International Application No. PCT/US2021/037213.

JP Final Decision of Rejection, JP Patent Application No. 2022-576365, Japanese Patent Office, Jun. 27, 2024 (3 pages) (English translation).

\* cited by examiner

EDGE CONTROLLER FOR A FACILITY

The present application claims the benefit of U.S. Provisional Patent Application Ser. No. 63/039,300, entitled "EDGE CONTROLLER ADAPTED TO PROVIDE A VARIETY OF DIFFERENT LOCAL DATA TYPES TO A REMOTE SERVER," filed on 15 Jun. 2020, and U.S. Provisional Patent Application Ser. No. 63/143,633, entitled "EDGE CONTROLLER ADAPTED TO PROVIDE A VARIETY OF DIFFERENT LOCAL DATA TYPES TO A REMOTE SERVER," filed on 29 Jan. 2021, both of which are incorporated herein by reference in their entirety.

TECHNICAL FIELD

The present disclosure relates generally to Industrial Internet of Things (IIOT) management systems. More particularly, the present disclosure relates to an edge controller for use in an IIOT management system.

BACKGROUND

IIOT management systems may be used to control operations of a variety of different facility management system components. Examples of facilities that may include an IIOT management system includes buildings, factories, industrial sites, and aircraft. Each of these different verticals often use different equipment, different communication protocols, different data, and different data formats. This can make it difficult to provide a system that can be readily deployed to control such varied systems.

BRIEF DESCRIPTION OF THE FIGURES

The disclosure may be more completely understood in consideration of the following description of various examples in connection with the accompanying drawings, in which.

Figure 1:
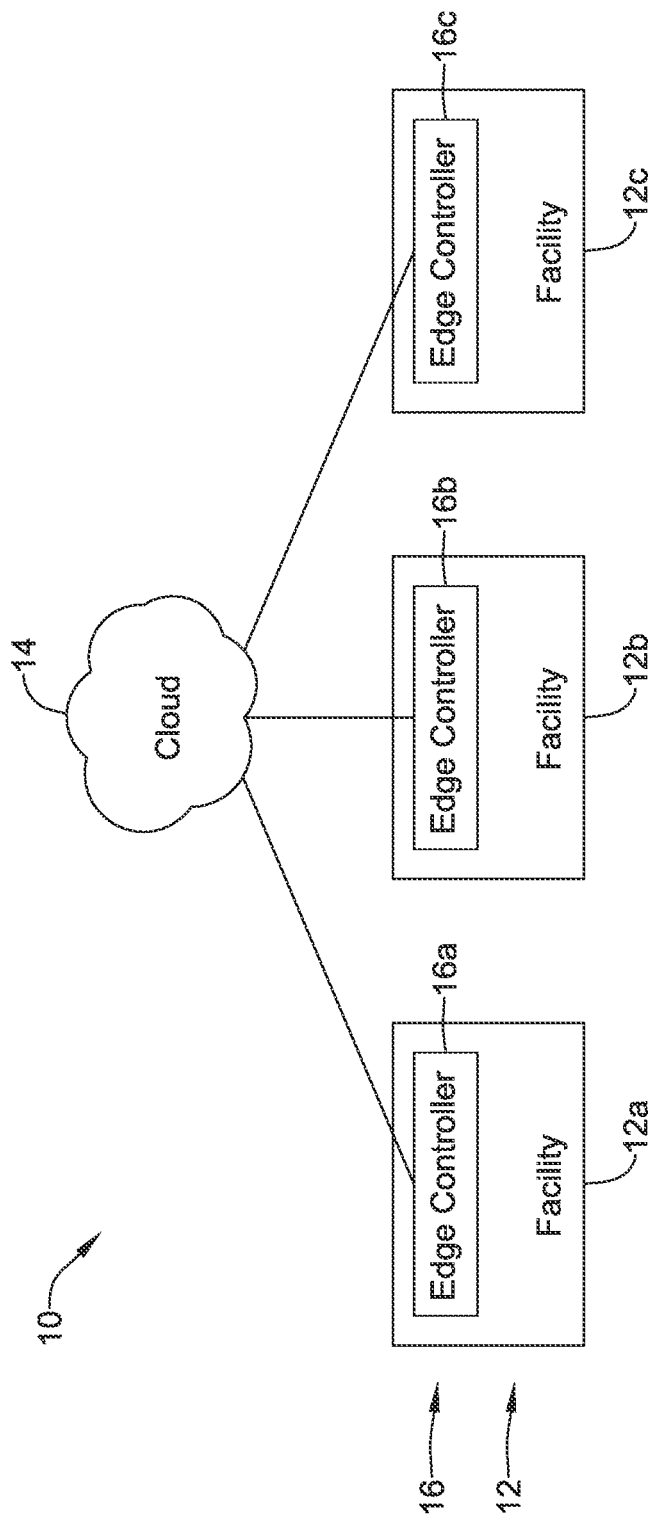
FIG. 1 is a schematic block diagram showing an illustrative facility management system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

Managing a facility (e.g. a building, an industrial site, or an aircraft system) and operations related with the assets of a facility can be a tedious process for a facility manager. Typically, management of many existing facility management systems by the facility managers involves significant guess-work and assumptions because the facility managers do not possess meaningful access to information technology (IT) and operational technology (OT) data associated with the assets of the facility. Further, there often lacks a system with capability to provide to a facility manager: (a) fast, easy, and efficient access to the OT and IT data along with underlying relationships existing amongst the data; and (b) an ability to analyze the data and contextual information associated with the data, in a meaningful manner. Furthermore, many of such facilities includes thousands or even millions of assets and many end-points (e.g. sensors, PLCs, valves, lightning systems, switches, controllers etc.) and the data associated with these assets and/or points can be complex. In many cases, there are inherent data ontologies, data models, enterprise patterns, relationships, etc., associated with data that is simply too complicated to be processed by conventional systems.

What would be desirable is a system than can provide the facility manager or a facility administrator with access to relevant data that is being transacted through the assets in a facility and any meaningful relationships that can be extracted from the data. This information can be utilized by the facility manager and/or the facility administrator for various purposes, e.g., but not limited to, reducing operating expense, improving operational performance of the facility, identifying bottlenecks, anticipating maintenance need and fault, etc. What would also be desirable is such a system that can connect to a variety of diverse systems (e.g. building sub-systems for a building facility, avionic sub-systems for an aircraft facility, industrial sub-systems for an industrial plant etc.).

Various example embodiments described herein relates to an edge controller. An example edge controller is capable of: automatically discovering and identifying assets in a facility, collecting data (e.g. telemetry data and/or metadata) from diverse types of the assets of a facility, transforming the data with diverse complexities and ontologies into a unified format, and providing the transformed data to a server. In some cases, the edge controller provides the data in a format to the server that can be processed by the server to determine meaningful relationships and insights from the data. In this regard, and in some cases, the server can develop an extended object model from the data received from the edge controller. Further, in some cases, the edge controller is capable of receiving configuration information based on which various applications supported on the edge controller can be configured to control operations associated with the assets of the facility. In this regard, the users (e.g. facility managers and/or facility administrators) can utilize a user-interface (UI) associated with the server and take fast and effective data driven decisions for managing the facility, by configuring various applications on the edge controller based on the configuration information.

For on-boarding and installing existing systems (e.g. Building management systems or Industrial controllers) that can control and manage a facility, a technician or an expert is often required to physically visit the site. On-boarding such existing systems can be a complex process, requiring integration of controller systems with several complex and diverse subsystems of the facility (each of which may be operating based on in its own way and protocol). Accordingly, on-boarding and installing such existing systems can take many man-hours (weeks) of effort to get the facility ready so that its operations can be managed remotely. Also, commissioning such systems often requires halting operations, shutting down of various assets or moving sub-systems of the facility into idle mode at least temporarily, thereby, resulting in loss of productivity and throughput of the facility.

The edge controller described in accordance with various example embodiments herein, is capable of being on-boarded or commissioned remotely without a need of an expert visiting the facility. Further, and in some cases, the edge controller is based on an architecture that supports containerized packages which enables the edge controller to be on-boarded remotely within a few minutes of effort hours, irrespective of the diverse and complex subsystems of the facility to which the edge controller is to be integrated. In other words, in some cases, the edge controller is capable of being on-boarded onto a site in a plug and play manner, further details of which are described herein. This seamless on-boarding experience of installing the edge controller on site helps the facility manager to get going with managing the facility operations and making real-time data driven decisions without halting any facility operation.

Industrial Internet of Things (IIOT) systems are used to control operations of a variety of different facility management system components of a facility. Examples of facilities that may include facility management system components include buildings and factories. Additional examples of IIOT systems that may include an IIOT management system include data collection, processing for aircraft maintenance, process control, factory automation, warehouse automation, manufacturing back office, worker safety devices and others. Each of these different types of facilities can produce prodigious volumes of data. FIG. 1 is a schematic block diagram of an illustrative facility management system 10 that may be used to facilitate data handling and various operational activities for each of a number of facilities 12. While a total of three facilities 12 are shown, labeled individually as 12a, 12b, 12c, in some embodiments there may be only one or two facilities 12. In an embodiment, there may be a much greater number of facilities 12. Each facility 12 may represent a building or part of a building. Each facility 12 may represent an industrial process or part of an industrial process. Each facility 12 may represent an aircraft. In an embodiment, each of the facilities 12a, 12b, 12c may represent similar types of facilities. In an embodiment, each facility 12 may represent different types of facilities.

In an embodiment, a cloud 14 is operably coupled with each of the facilities 12, meaning that communication between the cloud 14 and each of the facilities 12 is enabled. Operational data such as telemetry data and optionally associated metadata can be uploaded to the cloud 14 for processing. Telemetry data can include time stamps and data values corresponding to those time stamps. Instructions such as operational set points can be determined within the cloud 14 and can be downloaded to a particular facility 12 for execution. The operational set points may include, for example, air temperature, air humidity, delta pressure (e.g. for pump, fan, or damper), pump speed, chilled water temperature, hot water temperature, etc.

In an embodiment, the cloud 14 includes a server that is programmed to communicate with the facilities 12 and to exchange data as appropriate. The cloud 14 may be a single computer server or may include a plurality of computer servers. In some embodiments, the cloud 14 may represent a hierarchal arrangement of two or more computer servers, where perhaps a lower level computer server (or servers) processes telemetry data, for example, while a higher-level computer server oversees operation of the lower level computer server or servers.

A facility 12 may include a variety of different devices and controllers that communicate in different data formats, in different languages and/or different protocols. A facility 12 may include a variety of different devices and controllers, at least some of which communicate on different types of networks. In the example shown in FIG. 1, each facility 12 includes an edge controller 16, individually labeled as 16a, 16b, 16c. In an embodiment, each of the edge controllers 16 are configured to receive data from a variety of different devices and/or controllers within the facility 12 and can filter and translate the data into a common language and/or format for subsequent communication to the cloud 14. The common language and/or format may be compatible with and expected by the cloud. The edge controllers 16 provide a variety of different functions, as discussed herein.

Figure 2:
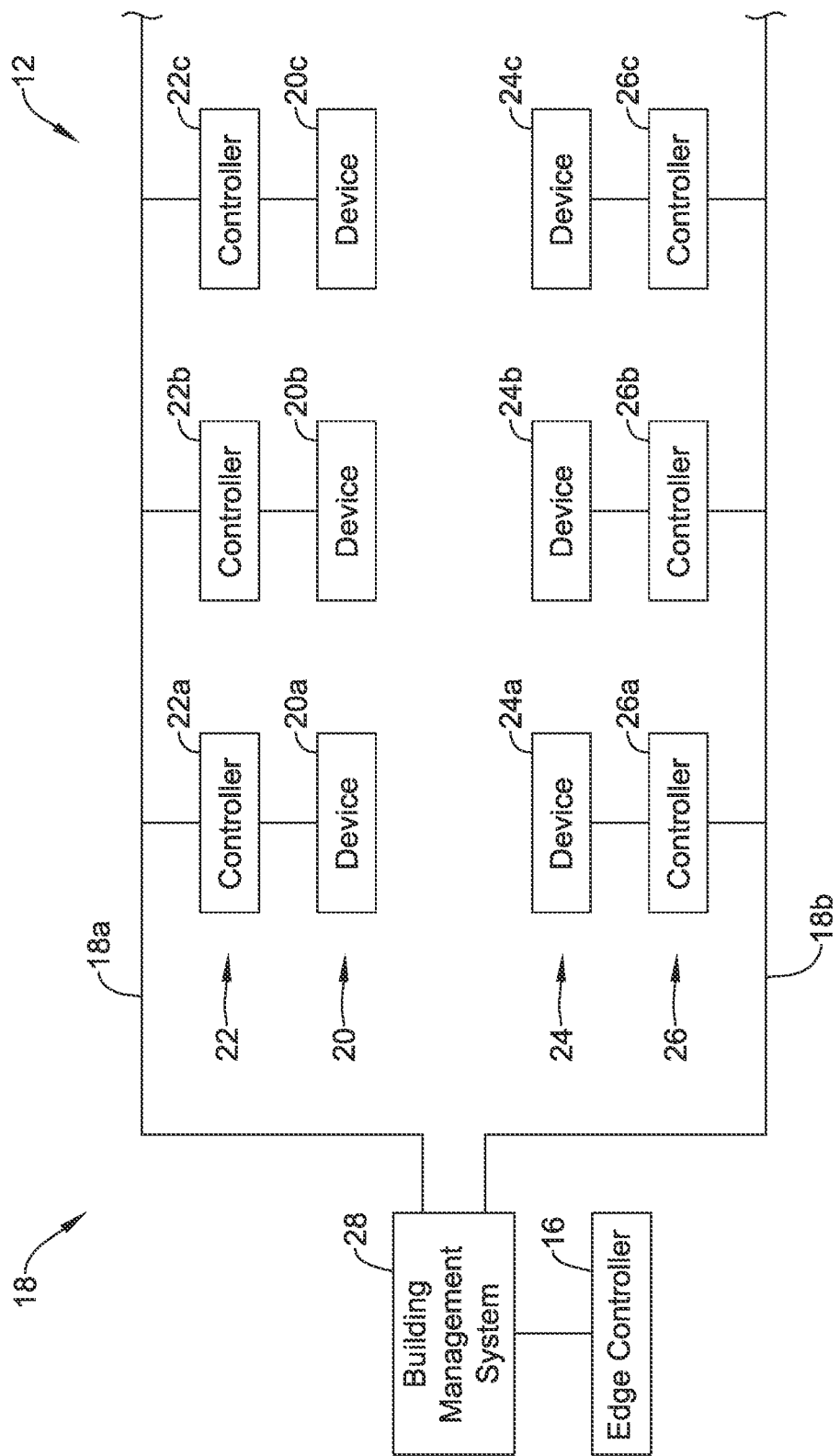
FIG. 2 is a schematic block diagram showing an illustrative facility in accordance with an example embodiment.

FIG. 2 provides an example of a facility 12, sometimes having multiple networks. In FIG. 2, the facility 12 includes a first network 18a and a second network 18b. In an embodiment, the facility 12 may include only a single network 18. In an embodiment, the facility 12 may include three or more different networks 18. Each of the networks 18 may include any available network infrastructure. In an embodiment, each of the networks 18 may independently be, for example, a BACnet network, a NIAGARA network, a NIAGARA CLOUD network, or others.

A number of local devices 20, individually labeled as 20a, 20b, 20c, are operably coupled to the first network 18a via a number of controllers 22, individually labeled as 22a, 22b, 22c. While a total of three local devices 20 and controllers 22 are shown, it will be appreciated that this is merely illustrative, as there may be any number of local devices 20 and controllers 22 operably coupled to the first network 18a and may in some situations include substantially more than three local devices 20 and associated controllers 22. The local devices 20 may represent any of a variety of different types of devices that may be found within the facility 12. In an embodiment, at least some of the local devices 20 are building management system components. Examples of building management system components include sensors, actuators, valves, etc. In another embodiment, at least some of the local devices 20 are equipment within a factory. In another embodiment, at least some of the local devices 20 are industrial process control devices within an industrial process. In another embodiment, at least some of the local devices 20 are airplane devices (e.g. aircraft Line-Replaceable Units (LRUs), flight management systems, avionic data bus) within an airplane.

In an embodiment, there is a one to one relationship between each of the local devices 20 and a corresponding one of the controllers 22. In another embodiment, one of the controllers 22 controls operation of two or more of the local devices 20. In another embodiment, one or more of the controllers 22 is built into one or more of the corresponding local devices 20, and thus is not a separate component. In another embodiment, one or more of the controllers 22 are virtual controllers that are implemented within a virtual environment hosted by one or more computing devices (not illustrated). One or more of the controllers 22 may thus be containerized. In another embodiment, at least some of the local devices 20 themselves are controllers. In such case, there may not be a separate corresponding controller 22.

A number of local devices 24, individually labeled as 24a, 24b, 24c, are operably coupled to the second network 18b via a number of controllers 26, individually labeled as 26a, 26b, 26c. While a total of three local devices 24 and corresponding controllers 26 are shown, it will be appreciated that this is merely illustrative, as there may be any number of local devices 24 and controllers 26 operably coupled to the second network 18b and may in some situations include substantially more than three local devices 24 and associated controllers 26. The local devices 24 may represent any of a variety of different types of devices that may be found within the facility 12. In an embodiment, at least some of the local devices 24 are building management system components. Examples of building management system components include sensors, actuators, valves, etc. In another embodiment, at least some of the local devices 24 are equipment within a factory. In another embodiment, at least some of the local devices 24 are industrial process control devices within an industrial process. In another embodiment, at least some of the local devices 24 are airplane devices within an airplane.

In an embodiment, there is a one to one relationship between each of the local devices 24 and a corresponding one of the controllers 26. In another embodiment, one of the controllers 26 controls operation of two or more of the local devices 24. In another embodiment, one or more of the controllers 26 is built into one or more of the corresponding local devices 24, and thus is not a separate component. In another embodiment, one or more of the controllers 26 are virtual controllers that are implemented within a virtual environment hosted by one or more computing devices (not illustrated). In another embodiment, at least some of the local devices 24 themselves are controllers. In such case, there may not be a separate corresponding controller 26.

In an embodiment, the facility 12 may include a Building Management System (BMS) controller 28 that is operably coupled with the first network 18a and the second network 18b. In another embodiment, the BMS controller 28 may be operably coupled with the first network 18a but not with the second network 18b. In another embodiment, the BMS controller 28 may be operably coupled with the second network 18b but not with the first network 18a. In an embodiment, the BMS controller 28 is a legacy controller. In another embodiment, the BMS controller 28 may be absent.

In an embodiment, an edge controller 16 is installed within the facility 12. The edge controller 16 may be considered as functioning as an intermediary between the local controllers 22, 26 and the cloud 14. For instance, in an example, the edge controller 16 can pull data from the local controllers 22, 26 and provide the data to the cloud 14. In an embodiment, the edge controller 16 is configured to discover the local devices 20, 24 and/or the local controllers 22, 26 that are connected along a local network such as the network 18. Details of discovery of assets (e.g. the local devices 20, 24) are further described herein. In an embodiment, the network protocol of the network 18 includes discovery commands that, for example, are used to request that all devices connected to the network 18 identify themselves. In some cases, the edge controller 16 is configured to discover the local devices 20, 24 regardless of an underlaying protocol supported by the local devices 20, 24. In other words, the edge controller 16 can discover various local devices 20, 24 supported by different protocols (e.g. BACnet, Modbus, LonWorks, SNMP, MQTT, Foxs, OPC UA etc.).

In an embodiment, the edge controller 16 interrogates any devices it finds operably coupled to the network 18 to obtain additional information from those devices that further helps the edge controller 16 and/or the cloud 14 identify the connected devices, such as type of building system components, functionality of the identified building system components, connectivity of the local controllers and/or building system components, types of operational data that is available from the local controllers and/or building system components, types of alarms that are available from the local controllers and/or building system components, and/or any other suitable information. For purpose of brevity, the additional information requested from the devices is referred interchangeably as, 'metadata', 'semantic data', or 'the model data', hereinafter throughout the description.

More generally, and in some examples, the edge controller 16 may be communicatively coupled to one or more physical assets, via one or more networks. For purpose of brevity, the term 'physical assets' is also referred interchangeably to as 'data points', 'end points' or 'electronic devices' throughout the description. According to various example embodiments described herein, the physical assets can be, for example, but not limited to, sensors, electronic components, pressure valves, HVACs, alarm units, building management systems, building controllers, industrial sub-systems, industrial controllers, lightning systems, air detective systems, air quality sensors, avionic subsystems, aircraft Line-replaceable Units (LRUs), flight management systems, avionic data bus, etc. These may correspond to, for example, one or more local devices 20, 24 of FIG. 2.

According to an example embodiment, the edge controller 16 is configured to receive at least one of, telemetry data and model data from various physical assets in a facility (e.g., but not limited to, a building, an industrial site, a vehicle, a warehouse, an aircraft etc.). In some examples, the telemetry data can represent time-series data and may include a plurality of data values associated with the assets which can be collected over a period of time. For instance, in an example, the telemetry data may represent a plurality of sensor readings collected by a sensor over a period of time. Further, the model data can represent meta-data associated with the assets. The model data can be indicative of ancillary or contextual information associated with the asset. For instance, in an example, the model data can be representative of geographical information associated with the asset (e.g. location of the asset) within a facility. In another example, the model data can represent a sensor setting based on which a sensor is commissioned within a facility. In yet another example, the model data can be representative of a data type or a data format associated with the data transacted through the asset. In yet another example, the model data can be indicative of any information which can define a relationship of the asset with one or more other assets in the facility. In accordance with various example embodiments described herein, the term 'model data' can be referred interchangeably as 'semantic model' or 'metadata' for purpose of brevity.

In accordance with an example embodiment, the edge controller 16 is configured to discover and identify one or more local devices 20, 24 and/or any other physical assets which are communicatively coupled to the edge controller 16. Further, upon identification of the assets, the example edge controller 16 is configured to pull the telemetry data and/or the model data from the various identified assets. In an example, these assets can correspond to one or more electronic devices that may be located on-premise in a facility. The edge controller 16 is configured to pull the data by sending one or more data interrogation requests to the assets. These data interrogation requests can be based on a protocol supported by an underlying physical asset. Examples of discovery and identification of assets in a facility are described in U.S. patent application Ser. No. 16/888,626, entitled "REMOTE DISCOVERY OF BUILDING MANAGEMENT SYSTEM METADATA", and filed on 29 May 2020, which is incorporated herein by reference.

In accordance with said example embodiment, the edge controller 16 is configured to receive the telemetry data and/or the model data in various data formats or different data structures. In an example, a format of the telemetry data and/or the model data, received at the edge controller 16 may be in accordance with a communication protocol of the network supporting transaction of data amongst two or more network nodes (i.e. the edge controller 16 and the asset). As can be appreciated, in some examples, the various assets in a facility can be supported by one or more of various network protocols (e.g., IOT protocols like BACnet, Modbus, LonWorks, SNMP, MQTT, Foxs, OPC UA etc.). Accordingly, and in some cases, the edge controller 16 is configured to pull the telemetry data and/or the model data, in accordance with communication protocol supported by an underlaying local device controllers 20, 24 (i.e. asset).

In some cases, the edge controller 16 is configured to process the received data and transform the data into a unified data format. The unified data format is referred hereinafter as a common object model. In an example, the common object model is in accordance with an object model that may be required by one or more data analytics applications or services, supported at the cloud 14. In some cases, the edge controller 16 can perform data normalization to normalize the received data into a pre-defined data format. In an example, the pre-defined format can represent a common object model in which the edge controller 16 can further push the telemetry data and/or the model data to the cloud 14. In some examples, the edge controller 16 is configured to establish a secure communication channel with the cloud 14. In this regard, the data can be transacted between the edge controller 16 and the cloud 14, via the secure communication channel, further details of which are described herein and in particular with reference to FIGS. 7-9.

In some cases, the edge controller 16 is configured to perform at least one of: (a) receiving at least one of: telemetry data and the model data from the assets; (b) normalizing the received data, which can include transforming the received data from a first format into a second format that supports a common object model; and (c) sending the transformed data representative of the common object model to the cloud 14. In accordance with some example embodiments, the edge controller 16 is configured to receive and aggregate the data (e.g., but not limited to, telemetry data and/or model data) from one or more sources in a facility. In some cases, the data and/or metadata information can be received and/or pulled from multiple assets corresponding to various independent and diverse sub-systems in the facility. In some cases, the edge controller 16 aggregates some or all of the data before sending the data to the cloud. For instance, the edge controller 16 may average a plurality of sensor readings received from a particular asset (e.g. particular sensor), and only send the average sensor value rather than each individual sensor reading. Furthermore, and in some cases, the edge controller 16 is configured to normalize at least some of the received data and send the normalized data to the cloud 14. For instance, airflow readings may be normalized to duct size, or temperature readings may be normalized to degrees F. when some temperature readings are received in degrees C. These are just examples. In some cases, the edge controller 16 can send the transformed data based on a data pull request received from the cloud 14. In another example, the edge controller 16 can send the transformed data automatically at pre-defined time intervals.

In some cases, the edge controller 16 is configured to define a protocol for performing at least one of: (a) data ingress from the one or more assets to the edge controller 16; (b) data normalization (e.g. normalizing the data into a common object model) and/or data aggregation; and (c) data egress for pushing the data out from the edge controller 16 (for example, to the cloud 14). In this regard, the edge controller 16 can be configured to define one or more rules for controlling which data (i.e. the telemetry data and/or the model data) is allowed ingress by the edge controller 16 for further processing. Further, the edge controller 16 can define rules for normalizing the data in accordance with a common object model, as further described herein. In some cases, the edge controller 16 can define rules for egressing the data and/or a transformed version of the data (e.g. the normalized data) out from the edge controller 16. In some examples, the edge controller 16 can ingress the data and further push the data into a data lake (e.g. a data pipeline). In an example, the data lake can be managed by the edge controller 16 and/or the cloud 14.

In some cases, the edge controller 16 is configured to support one or more containerized packages. These containerized packages can include one or more applications, drivers, firmware's, executable files, services etc., that can be configured based on configuration information from the cloud 14. These containerized packages supported at the edge controller 16 can pull the telemetry data and/or the model data from the one or more assets in the facility. Further, in accordance with some example embodiments, the edge controller 16 is configured to utilize the containerized packages to perform one or more operations corresponding to at least one of: the data ingress, the data normalization and/or data aggregation, and the data egress, as described further herein. Furthermore, the containerized packages can be configured to control one or more operations associated with the assets of the facility.

In accordance with some example embodiments, the containerized packages can include one or more drivers that can be configured to auto-discover and identify one or more assets in a facility. In this regard, the containerized packages can enable the edge controller 16 to access the assets, identify the one or more assets based on the interrogation of the assets, and configure one or more data transaction capabilities of the assets. The data transaction capability referred to herein can indicate, for example, what data is to be pulled from a particular asset and/or how frequent data is to be pulled from the particular asset, and/or what metadata is to be pulled from the particular asset. In some cases, the containerized packages can be utilized to configure at least one of: (a) a selection of data which is to be pulled from an asset; (b) a frequency at which the data is to be pulled from an asset; (c) selection of an asset from amongst the multiple assets from which the data is to be requested by the edge controller 16; and (d) a selection of metadata associated with an asset which is to be requested by the edge controller 16. In an example embodiment, a containerized package at the edge controller 16 can include one or more of: drivers, native firmware, library files, application file, and/or executable files that can enable one or more functions as described herein, with respect to the edge controller 16.

According to some example embodiments, the containerized packages can be configured to pull the data from the assets onto the edge controller 16 by sending data interrogation requests to various assets. These data interrogation requests can be defined in a format in accordance with a network protocol supported by the particular assets. Typically, various assets of a facility may support different network protocols (e.g. IOT based protocols like BACnet, Modbus, Foxs, OPC UA, Obix, SNMP, MQTT etc.). In some example embodiments, the containerized packages are customizable and user-configurable so as to cater to any type of asset supported by any network protocol. In other words, the containerized packages can be configured to pull the data and/or the metadata from various assets regardless of the type of asset and/or the underlying network protocol for communication with the asset. In some cases, the edge controller 16 supports one or more containerized packages that can cause automatic discovery and identification of assets of various subsystems in a facility regardless of an asset type (e.g. modern sub-system or legacy sub-system, OEM manufactured, native asset etc.). An example of containerized packages of the edge controller 16 and its associated operations are further described herein and in particular with respect to FIG. 5.

As described herein, the edge controller 16 is configured to capture the data (e.g. the telemetry data and the semantic model) from various assets in the facility. Further, in some cases, the edge controller 16 is configured to provide to the cloud 14 at least one of the data and a common object model determined from the data. In some example embodiments, the cloud 14 can further process the received data and/or the received common object model to create an extended object model (EOM). An extended object model (EOM) is representative of a data model which unifies several data ontologies, data relationships, and/or data hierarchies into a unified format. The EOM can be utilized for further data analytics and reporting one or more KPIs, contextual insights, performance, and operational insights of a facility.

In an example, the edge controller 16 can utilize one or more asset templates associated with each asset for modelling the data into the unified format (i.e. object model). As an example, an asset template defines the typical properties for assets of an asset type. For instance, in an industrial facility, an asset can be a 'pump' and its properties can include inlet and outlet pressure, speed, flow etc. An asset property can also define a hierarchical relationship of an asset type with its base asset type. For instance, a reciprocating pump is a special type of an asset type for a base asset-pump. Accordingly, this hierarchical information can also be added to the asset properties associated with the asset-pump. Further, the edge controller 16 can configure asset instances associated with each asset based on the configuration information. These asset instances can be configured with a common structure and defines a control logic for controlling and/or managing the operations of individual assets and its data transaction capability. In some examples, the asset instances can also define expected attributes of the asset.

In an example embodiment, the extensible object model (EOM) can include one or more knowledge graphs. In an example, the knowledge graphs can be associated with at least one of: the assets, the facility, and/or one or more operations associated to the assets of the facility. In some cases, the EOM may include a collection of application programming interfaces (APIs) that enables a seeded semantic object model (e.g. the common object model) to be extended. In some cases, the extensible object model further enables a customer's (e.g. facility provider) knowledge graph to be built subject to the constraints expressed in the customer's semantic object model. A knowledge graph describes real world entities and their interrelations, organized in a graph. A knowledge graph defines possible classes and relations of entities in a schema and enables the inter-relating of potentially arbitrary entities and covers various topical domains. Knowledge graphs may include large networks of entities, their semantic types, properties, and relationships between entities. The entities may be physical entities or non-physical entities, such as data. Examples of the EOM are described in U.S. Provisional Patent application Ser. No. 63/093,121, entitled, "EXTENSIBLE OBJECT MODEL AND GRAPHICAL USER INTERFACE ENABLING MODELING", and filed on 16 Oct. 2020, which is incorporated herein by reference.

Typically, in facilities having several assets, there may exist several inherent data ontologies, data models, enterprise patterns, relationships etc. associated with data that is pulled from the assets. For example, a building facility may include thousands or even millions of physical assets (e.g. sensors, valves, lightning units etc.) deployed within the facility. These assets may be provided by various manufacturers, and each of these assets may be transacting the data in its own way and data format. In some cases, the data models and relationships existing amongst the assets and/or data points can be complex. For example, the data pulled from the assets by the edge controller 16 can be associated with: (a) several different data ontologies; and (b) several complex data models. When manually installed and configured such a facility, unifying such complex data into a standard format and identifying existing relationships and patterns for further data analysis can be complex, involve many man-hours, and in some cases can be practically unfeasible to perform. In contrast, the edge controller 16 and/or cloud 14 can develop an EOM based on performing data processing which can include at least one of: (a) data normalization and/or data aggregation; (b) identification of several contextual relationships existing amongst the data and/or the assets; (c) identifying data patterns associated with an enterprise systems (i.e. OT data); and (d) extending the data model based on different data patterns such as, data architecture pattern, message flow pattern, enterprise data pattern etc. to identify contextual relationships amongst the assets and/or the data transacted through the assets.

In an example embodiment, at least one of the edge controller 16 and the cloud 14 is configured to utilize the common object model and/or the EOM to identify one or more of: (i) objects of interest; and (ii) objects which are not of interest for performing further data analysis. For instance, in one example, the common object model and/or the EOM can be utilized by the cloud 14 to identify a set of assets and/or end points from which more data is to be pulled onto the edge controller 16 and/or the cloud 14. In an example, the common object model and/or the EOM can be analyzed by the cloud 14 to identify one or more configuration parameters based on which the data can be pulled from the assets of a facility. In an example, the cloud 14 can utilize the common object model and/or the EOM to identify a set of assets from amongst the plurality of assets. Further, one or more applications on the edge controller 16 can pull the telemetry data and/or the model data from the identified set of assets and provide this data and/or its common object model to the cloud 14.

In some cases, an application and/or a web service on the edge controller 16 and/or the cloud 14 can utilize the EOM to identify a contextual relationship based on which it can request the edge controller 16 to pull more data from the underlying local devices 20, 24. In an example, the application and/or the web service can use this data for further analysis, e.g., but not limited to, for reporting one or more key performance indicators (KPIs) or insights associated with the facility and/or operations of the assets. Examples of reporting KPIs based on analysis of the object model data are described in U.S. Provisional Patent Application Ser. No. 63/183,930, filed on May 4, 2021, which is incorporated herein by reference.

Accordingly, for facilities having several (e.g. thousands) of data points, rather than pulling all of the data from all of the data points, the edge controller 16 and/or the cloud 14 can identify points of interests based on the common object model and/or the EOM and accordingly pull the data as per the points of interests. According to some examples, the points of interests can be indicative of at least one of: (a) a set of assets from amongst the plurality of assets from which the edge controller 16 is to pull the data and forward its corresponding object model to the cloud 14; (b) type and/or frequency of data based on which the data is to be pulled from the assets; and (c) an event (e.g. a situation in a pre-defined context) based on which the data is to be pulled from the assets. Thus, the common object model and/or the extended object model can be analyzed to selectively pull the data from the assets and/or data points for a defined context. In accordance with various example embodiments described herein, the edge controller 16 and/or the cloud 14 can perform a context discovery process to analyze the common object model and create the extended object model. Further details of the context discovery process are described herein. Furthermore, in some example embodiments, the cloud 14 can provide configuration information to the edge controller for controlling one or more operations related to assets of the facility. The configuration information can be determined based on utilizing the EOM by the cloud 14. In an example, the configuration information can be used by one or more applications (e.g. containerized packages) on the edge controller 16 to remotely start/stop an equipment of the facility or change the setpoint of an equipment to a new value.

In an example embodiment, the cloud 14 can include one or more analytic models to analyze the EOM for various purposes. For example, the cloud 14 can include one or more of: first principle models, empirical models, engineered models, user-defined models, machine-learning models, built-in functions, and/or the like, to identify one or more data-driven insights associated with the facility. These models can be developed based on: (a) utilizing pre-defined heuristics and knowledge base associated with operations of the assets of the facility; and (b) feedback loop (i.e. closed loop) from on-going operations of the assets that are based on the control logic defined by the configuration information (e.g. site configuration) received at the edge controller 16 from the cloud 14.

In some embodiments, metadata collected from devices on the network 18 can be utilized by the edge controller 16 and/or the cloud 14 to identify the devices. As described herein, metadata can include semantic model data that describes, for example, what a particular data value represents. In one example, telemetry data may report a value of 68 and a time of 4 pm. The corresponding metadata may identify that the value is a temperature reading of 68 degrees Fahrenheit that was taken at 4 pm. In some examples, metadata can also provide an indication of what an asset is and/or where the asset is located. For example, metadata may indicate that an asset is an air handling unit (AHU) installed on the $3^{rd}$ floor of building number 321. In some embodiments, this metadata can instruct the edge controller 16 and/or the cloud 14 as to an expected format of data that will be provided by a particular device. It will be appreciated that types of data collected by the edge controller 16 can vary based on the particular type of the facility 12. For example, in a building having a Heating, Ventilating and Air Conditioning (HVAC) system, examples of data that may be collected include telemetry data such as time series of sensor readings, meter data, actuator position data, and control signals. Examples of sensor readings include temperatures, pressures, flow rates and the like. Examples of meter data include gas meter data and electrical meter data. Examples of control signals include plant enable signals, cooling demand signals and heating demand signals. In an example, the edge controller 16 can collect the data and sends authorized data and/or metadata to the cloud 14 while holding back the un-authorized data and/or un-authorized metadata. The un-authorized data can refer to the portion of the data which is not subscribed by the cloud 14. In another example, the un-authorized data can refer to the portion of the data to which access rights are not granted to an application or a web service on the cloud 14. In an example, the edge controller 14 can also maintain a cache to store the data and/or the metadata collected from the assets. In this regard, in case of an outage (e.g. a site outage or a network outage), the edge controller 14 can store the data in the cache and resume the data transaction operations using the data stored in the cache, once system is resumed/re-established.

In an embodiment, the edge controller 16 is configured to provide some or all of the data collected from the devices to the cloud 14. The cloud 14 can utilize this information to create a site configuration for the facility 12. In another embodiment, the edge controller 16 itself may process the information locally and/or may create the site configuration for the facility 12. In embodiments in which the edge controller 16 passes information up to the cloud 14, and the cloud creates the site configuration, the resulting site configuration may be provided from the cloud 14 to the edge controller 16. In some examples, the site configuration can be created by the cloud 14 and/or the edge controller 16 based on utilizing at least one of the common object model and/or the EOM as described herein. In an embodiment, the edge controller 16 is configured to provide appropriate local configurations to each of the controllers 22, 26 such that each of the controllers 22, 26 is best able to control operation of the local devices 20, 24 for which they are responsible. In some embodiments, the edge controller 16 may be configured to collect operational data regarding operation of the local devices 20, 24 that is initially collected by the controllers 22, 26, and may be configured to provide at least some of the collected operational data to the cloud 14.

In an embodiment, the edge controller 16 is configured to execute any of a variety of different payloads that are downloaded to the edge controller 16 from the cloud 14. In an embodiment, the edge controller 16 may include one or more installed payloads prior to installation of the edge controller 16 at the facility 12. In some embodiments, the edge controller 16 may be configured to detect or otherwise learn specifics of the local devices 20, 24, and may receive one or more particular payloads customized to the details of the local devices 20, 24 within the facility 12. The one or more particular payloads may be customized to a particular type of the facility 12. In an embodiment in which the facility 12 is a building, and the local devices 20, 24 are building management system components, the cloud 14 may download to the edge controller 16 one or more software packages customized for use with building management system components. The particular payloads may include software packages and may be considered configuration information that is downloaded to the edge controller 16 from the cloud 14. In some embodiments, the particular payloads may include a Niagara software payload, a BACnet software payload, and the like.

In some cases, the edge controller 16 is configured to host one or more containerized packages that includes instances of one or more applications configured to manage one or more operations associated with the local devices 20, 24. For instance, in an example, the containerized packages can be configured to pull the telemetry data and/or the model data from the one or more local devices 20, 24 in the facility. As an example, the edge controller 16 hosts a Docker environment that can run virtual containers on hardware executing the Linux operating system. In some embodiments, the edge controller 16 may utilize ARM's Pelion Edge framework as a distributed Docker container host. It will be appreciated that this is merely illustrative, as other virtual container and/or virtual machine environments may be used, depending on the application. In any event, when so outfitted, the configuration information may spawn and/or configure one or more of the virtual controllers on the edge controller 16. As described herein, the containerized packages can include one or more virtual controllers and/or drivers that can be configured to manage various operations associated with the devices underlying the edge controller 16. For instance, the virtual controllers can be configured to obtain device data from the one or more local devices 20, 24, format, filter and/or perform analytics on the device data and send a representation of at least some of the device data to the cloud 14. In some examples, the containerized packages can be utilized in accordance with a site configuration provided by the cloud 14 to the edge controller 16.

In some cases, the edge controller 16 can be configured to start out as a device in blank slate. In other words, the edge controller 16 at a time of installation may have required configuration information for commissioning and managing the local devices 20, 24 and/or heuristic knowledge about the assets and/or the network environment of the facility. In accordance with an example embodiment described herein, the edge controller 16 can be configured remotely by using a web service. In an example embodiment, the edge controller 16 can receive configuration information from the cloud 14 based on which it can perform various operations as described herein. Further, upon configuration, the edge controller 16 can be configured to automatically discover and identify the local devices 20, 24 in the network on which the edge controller 16 is being deployed. Said differently, the edge controller 16 can be configured to function appropriately in whatever network environment of the facility the edge controller 16 is provisioned. It will be appreciated that a benefit of the edge controller 16 as described herein is that it doesn't require a field worker and/or an on-site technician or expert to be deployed on-premise for configuring and setting up the edge controller 16 on-site, thereby saving many man-hours of effort. In an example, the configuration information can be downloaded to the edge controller 16 from the cloud 14 and/or the web service. The configuration information may include data collection functions as well as site onboarding functions. The site onboarding functions can enable the edge controller 16 to collect data from the facility 12. Further, the site on-boarding functions can also enable the edge controller 16 to facilitate onboarding or configure a connection between the edge controller 16 and the cloud 14 for providing data that is collected from the local devices 20, 24 and/or from the controllers 22, 26 for transmission to the cloud 14.

Figure 3A:
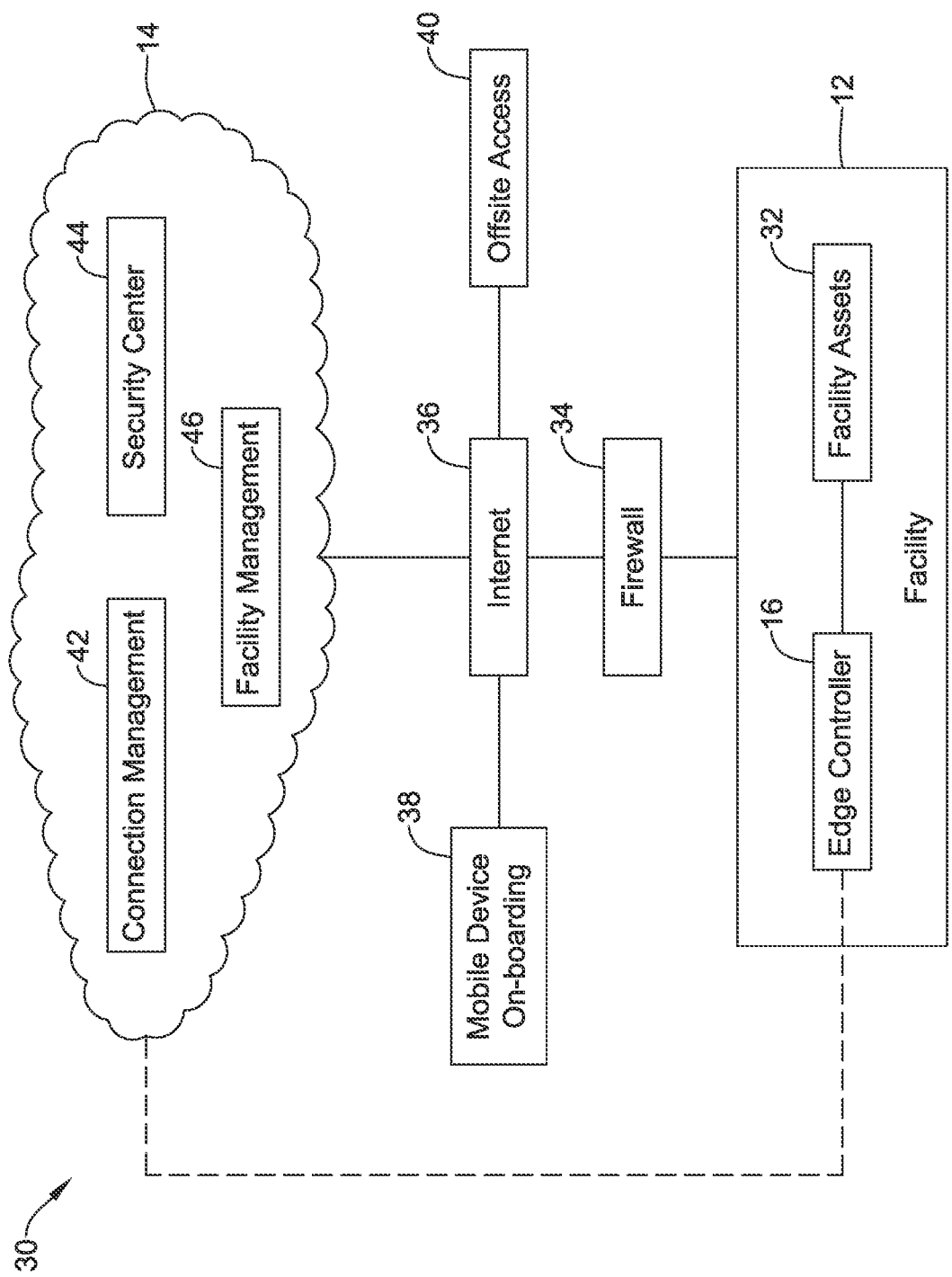
FIG. 3A is a schematic block diagram showing an example of the illustrative facility management system in accordance with another example embodiment.

FIG. 3A is a schematic block diagram of an illustrative facility management system 30. The facility management system 30 may be considered as an example of how the edge controller 16 may be used within the facility 12 to assist with managing the facility 12. In an embodiment, the facility 12 includes facility assets 32. In an embodiment, the facility assets 32 include local devices such as the local devices 20, 24 of FIG. 2. In another embodiment, the facility assets 32 include local controllers such as the controllers 22, 26 of FIG. 2. In another embodiment, the facility assets 32 include one or more networks such as the network 18 and/or the BMS controller 28 of FIG. 2. In an embodiment, the edge controller 16 is installed at the facility 12 such that the edge controller 16 is able to learn the identity and features of each of the facility assets 32 and is able to oversee operation of one or more of the facility assets 32. In an embodiment, the edge controller 16 has one or more ports for communicating with the facility assets 32. In an embodiment, the edge controller 16 has one or more ports for communicating with assets that are exterior to the facility 12.

In an example embodiment, the edge controller 16 is configured to transact the data received from the local devices 20, 24 up to the cloud 14 through a secured communication channel (e.g. a VPN tunnel). In an example embodiment, a firewall 34 is positioned between the facility 12 and the Internet 36. Communications between the edge controller 16 and assets that are exterior to the facility 12 may pass through the firewall 34 and thus reach the Internet 36. In some embodiments, as will be discussed, the edge controller 16 includes a cellular capability that allows the edge controller 16 to communicate with assets that are exterior to the facility 12 before access through the firewall 34 has been granted or otherwise enabled. In an embodiment, a mobile device on-boarding block 38, which is connected or connectable to the Internet 36, may permit a user to use their smartphone or other mobile device in performing at least some of the tasks involved in setting up and configuring the edge controller 16. In an embodiment, an Offsite Access block 40, which is connected or connectable to the Internet 36, may permit a technician or other expert to work on setting up and configuring the edge controller 16 from a remote location.

In an embodiment, the cloud 14 is operably coupled to the Internet 36 such that information can be sent to the cloud 14 via the Internet 36 from other assets such as the facility assets 32, the edge controller 16, the mobile device on-boarding block 38 and the Offsite Access block 40. Information can be sent from the cloud 14 to the other assets such as the facility assets 32, the edge controller 16, the mobile device on-boarding block 38 and the Offsite Access block 40 via the Internet 36.

The illustrative cloud 14 includes a Connection Management block 42, a Security Center block 44 and a Facility Management block 46. In some embodiments, the Connection Management block 42 is configured to help with registration of the edge controller 16 as well as to orchestrate and oversee the containers that are downloaded to the edge controller 16 from the cloud 14 in order to allow the edge controller 16 to accomplish its tasks. In some embodiments, the Security Center block 44 is configured to allow a remote technician (such as that represented by the Offsite Access block 40) to be able to access the edge controller 16 when the remote technician is not at the location at which the edge controller 16 has been installed. In some cases, the Security Center block 44 can implement a secure VPN connection between the remote technician and the edge controller 16. In an embodiment, the Facility Management block 46 is configured to overseen operation of the edge controller 16, and thus oversee operation of the facility assets 32 within the facility 12.

Figure 3B:
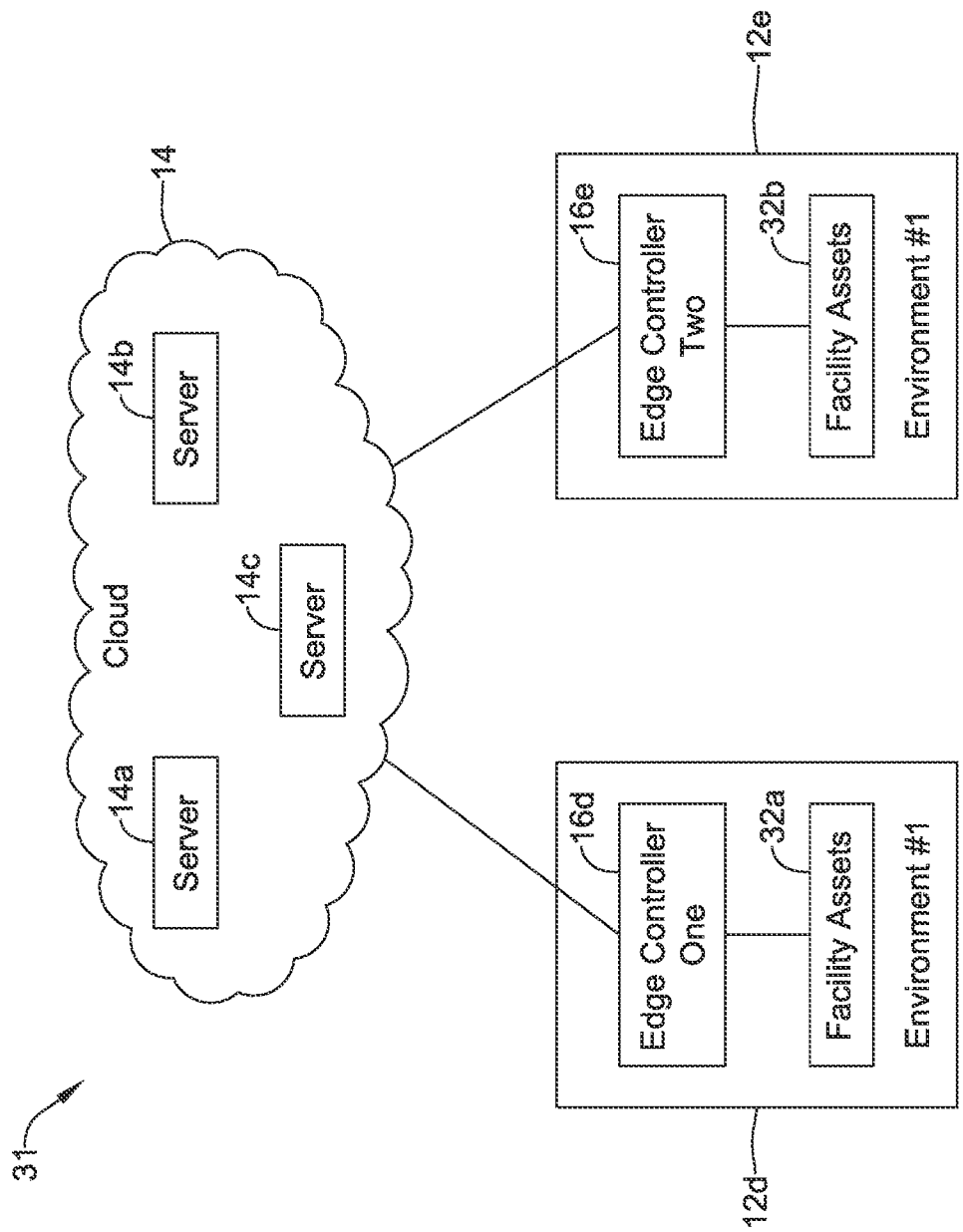
FIG. 3B is a schematic block diagram showing an example of the illustrative facility management system in accordance with another example embodiment.

FIG. 3B is a schematic block diagram of an illustrative facility management system 31. The facility management system 31 may be considered as an example of using processing resources of one or more of the edge controllers and/or other processing resources at one or more of the facilities 12d and 12e to support the configuration and/or operation of an edge controller of another facility. More generally, the illustrative facility management system 31 is configured to selectively use under-utilized computing resources of the edge controllers and/or other processing resources at one or more of the facilities 12d and 12e to help reduce the processing load on the cloud servers 14a-14c and/or on the edge controllers and/or other processing resources at other facilities. In some cases, the cloud 14 may provide distributed processing as a service, where one facility or customer may request additional processing, and the cloud 14 may be configured to distribute the requested processing among various under-utilized edge controllers and/or other processing resources in the various facilities. In some cases, the cloud 14 may use a plurality of under-utilized edge controllers to run an application.

Alternatively, or in addition, the facility management system 31 may be configured to identify when a particular processing task has been completed by a first edge controller and/or other processing resource at a first facility to produce a first output, and also recognize that a second edge controller and/or other processing resource at a second facility needs to perform the same or similar processing task (e.g. context discovery, configuration management of assets etc.). When this occurs, the facility management system 31 may request the first output from the first edge controller and direct the first output to the second edge controller. The second edge controller then need not duplicate the particular processing task that has already been performed by the first edge controller. An example of this may be when a first edge controller performs context discovery and other configuration processing tasks to configure the first edge controller for use in a first facility. Subsequently, a second edge controller may be installed at a second facility, where the second facility is equipped, configured and/or operated in a similar manner to the first facility (e.g. by the same customer). When this occurs, the cloud 14 may identity that the second edge controller is to be configured similar to the first edge controller, and in response, the cloud 14 may instruct the first edge controller to provide certain configuration and/or other files to the cloud 14, and the cloud 14 may direct these configuration files to the second edge controller. The second edge controller thus need not duplicate the processing tasks there were already performed by the first edge controller.

In the example shown in FIG. 3B, the facility management system 31 includes a facility 12d and a facility 12e. While two facilities 12d, 12e are illustrated, it will be appreciated that the facility management system 31 may include any number of facilities 12. The facility 12d includes an edge controller 16d and facility assets 32a, while the facility 12e includes an edge controller 16e and facility assets 32b. In embodiments in which there are additional facilities 12, each of the additional facilities 12 may include an edge controller 16 and facility assets 32.

The cloud 14 is illustrated as including a server 14a, a server 14b and a server 14c. In some embodiments, the cloud 14 may only include one or two servers, or may include four, five or more distinct servers. In some embodiments, the cloud 14 may provide distributed computing services, in which tasks can be moved from server to server as appropriate to balance workloads on each of the servers. In this way, if a particular server, say server 14a becomes heavily loaded while other servers such as the server 14*b* and/or the server 14*c* have available processing power and/or available memory space, some of the tasks currently being performed by the server 14*a* may be moved over to the server 14*b* and/or the server 14*c* so that the other server(s) can assist the server 14*a* with its current heavy workload. It will be appreciated that the relative workloads on each of the servers 14*a*, 14*b*, 14*c* may vary over time, such that while server 14*a* may be heavily loaded at a particular point in time, at other particular points in time it may be the server 14*b* and/or the server 14*c* that is heavily loaded.

In some embodiments, at least some of the workload of one or more of the servers 14*a*, 14*b*, 14*c* may be temporarily offloaded to one of the edge controllers 16. If for example, edge controller 16*d* is currently lightly loaded and has available computing capacity (e.g. under-utilized), the cloud 14 may provide the edge controller 16*d* with additional temporary computing tasks that the cloud 14 would otherwise have to perform. In some embodiments, and as another example, say that the facility 12*d* is an existing facility that is up and running, while the facility 12*e* is a new facility. Because the facility 12*d* is already up and running, it is indicative of the fact that heavy computational workload of performing context analysis and the like, has already been accomplished for the facility 12*d*, while this still needs to occur for the facility 12*e*. In this situation, the cloud 14 may instruct the edge controller 16*d* to assist with some of the heavy computational load that would otherwise fall upon the edge controller 16*e*. This may involve uploading certain data from the edge controller 16*e* up to the cloud 14, and then back down to the edge controller 16*d* for processing. As another example, formatting and other configurational tasks already accomplished by the edge controller 16*d* may be copied over to the edge controller 16*e*.

Figure 4:
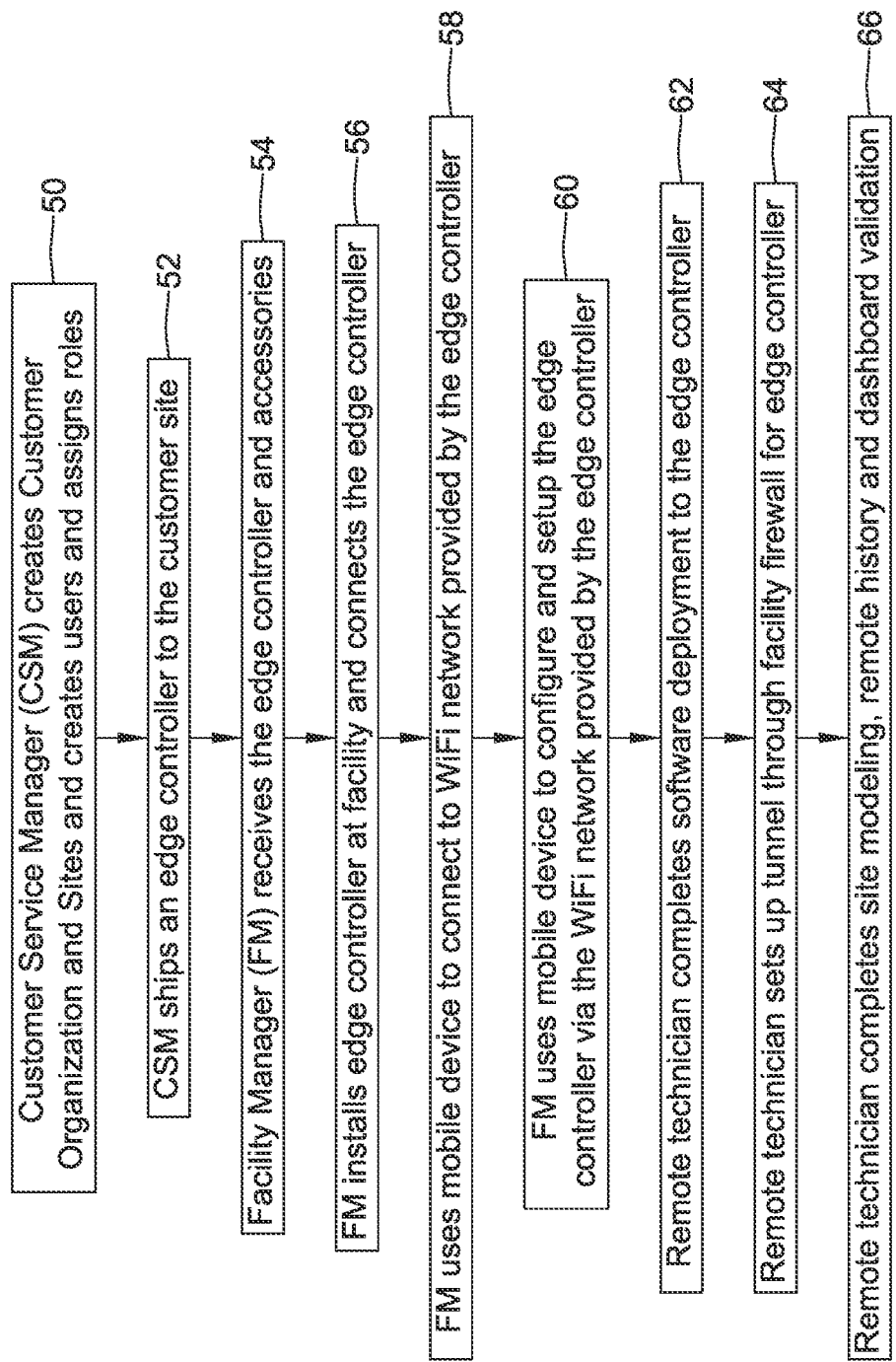
FIG. 4 is a flow diagram showing an illustrative method of commission an edge controller of a facility in accordance with an example embodiment.

FIG. 4 is a flow diagram showing an illustrative method 48 by which an edge controller 16 may be requested, obtained, and installed at the facility 12. It will be appreciated that a benefit of the edge controller 16 as described herein is that the process of setting up and configuring the edge controller 16 does not require substantial time commitment by on-site technical experts. As an example, while conventionally it might take 7-10 days and many man-hours to perform commissioning and/or configuration of devices like edge controller on-premise at a facility, by way of implementation of several embodiments described herein, the edge controller 16 can be onboarded and configured to interact with various assets in the facility within few hours (e.g. 2-3 hours) based on the remote configuration capability of the edge controller 16. The description herein provides details of remotely configuring the edge controller 16 in accordance with some example embodiments. As may be appreciated, by way of implementation of various embodiments described herein, much of the process of configuring the edge controller 16 for operation at a particular facility 12 can occur remotely (e.g., by a web interface or web service associated with the cloud 14). In an example, some portions of on-boarding and/or configuring the edge controller 16 in the facility can be completed by a person at the facility using their smartphone or other mobile device. In another example, some portion of on-boarding and/or configuring the edge controller 16 in the facility can be completed by a technician who is located remote from the facility 12.

A customer service manager (CSM) creates a customer organization and site(s) within the Facility Management block 46 of the cloud 14, as indicated at block 50. This may occur offsite. A customer may have a single organization with a single site. In some embodiments, their organization may have two, three or more sites that can be geographically distinct. In some embodiments, creating the customer organization and site(s) within the Facility Management block 46 occurs after a sales associate has reviewed the potential site to ensure that the potential site will benefit from the edge controller 16 and the Facility Management block 46. The CSM may also create users and assign roles. For example, some users may have relatively greater access rights while other users may have relatively lesser access rights. A facilities manager may have greater access rights than a tenant, for example. An edge controller is then shipped to the customer site, as indicated at block 52. A facilities manager (FM) at the site receives the edge controller and any appropriate accessories at their site, as indicated at block 54. Accessories may, for example, include one or more of a mounting bracket, a wall wart, Wi-Fi antennas, cellular antennas, cables such as Ethernet cables, screws, and dust caps.

After reviewing a Quick Start Guide, the FM installs the edge controller and connects the edge controller at the site, as indicated at block 56. In some embodiments, this can include securing the edge controller to a vertical surface such as a wall or a cabinet, either directly or using a mounting bracket. The FM may attach one or more cables to the edge controller, depending on the needs of the facility assets 32 within the facility 12.

Figure 23:
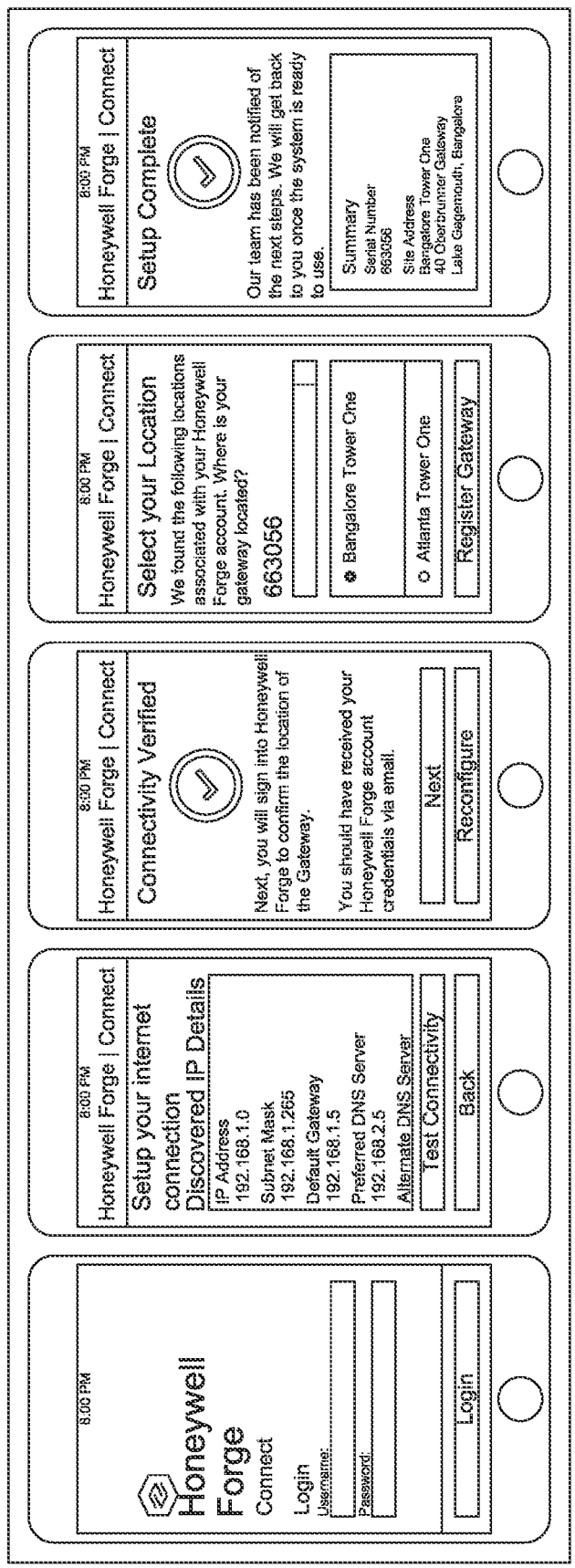
FIG. 23 shows an example of a user using a smartphone to perform at least some of the tasks involved in setting up and configuring an edge controller of a facility.

In some cases, the FM uses their smartphone or another mobile device such as a tablet, a phablet, or a laptop to connect to a Wi-Fi network that is automatically provided by the edge controller, as indicated at block 58. In some embodiments, the FM may configure the edge controller for use with the available network at the facility 12. This may include identifying an SSID, a password, a Dynamic Host Configuration Protocol (DHCP) network, etc. This may include identifying and selecting a network that provides a static IP address. The mobile device may display one or more screens that enable the FM to configure the edge controller for use with the available network. In some embodiments, the FM may be able to use their smartphone or other mobile device to scan a QR code that may be used to initiate or otherwise start an application running on the FM's mobile device that can be used in configuring the edge controller. Configuring the edge controller may include the FM confirming the appropriate location for the edge controller using one or more screens displayed by the mobile device. An example of a facilities manager using their smartphone to register their edge controller is shown in FIG. 23.

In accordance with an example embodiment, various information useful for on-boarding and/or configuration of the edge controller 16 in the facility can be provided on a user interface (UI) of the device used by the FM. As an example, the assets of the facility that are identified based on an 'auto-discovery' process as described herein by the edge controller 16 can be displayed on the UI. Further, the UI can display configuration parameters that are determined based on the context discovery and/or the EOM. The FM can use the UI to: (a) select, modify, and/or provide one or more configuration parameters; and/or (b) define one or more attributes associated with these configuration parameters to configure the containerized packages and/or one or more applications on the edge controller 16. As described herein, in some cases, containerized packages and/or the one or more applications on the edge controller 16 are configured to perform at least one of: managing operations associated with the assets; defining control logic associated with the assets of the facility; and/or defining data transaction rules/logic for pulling and pushing the data through the assets.

Figure 24:
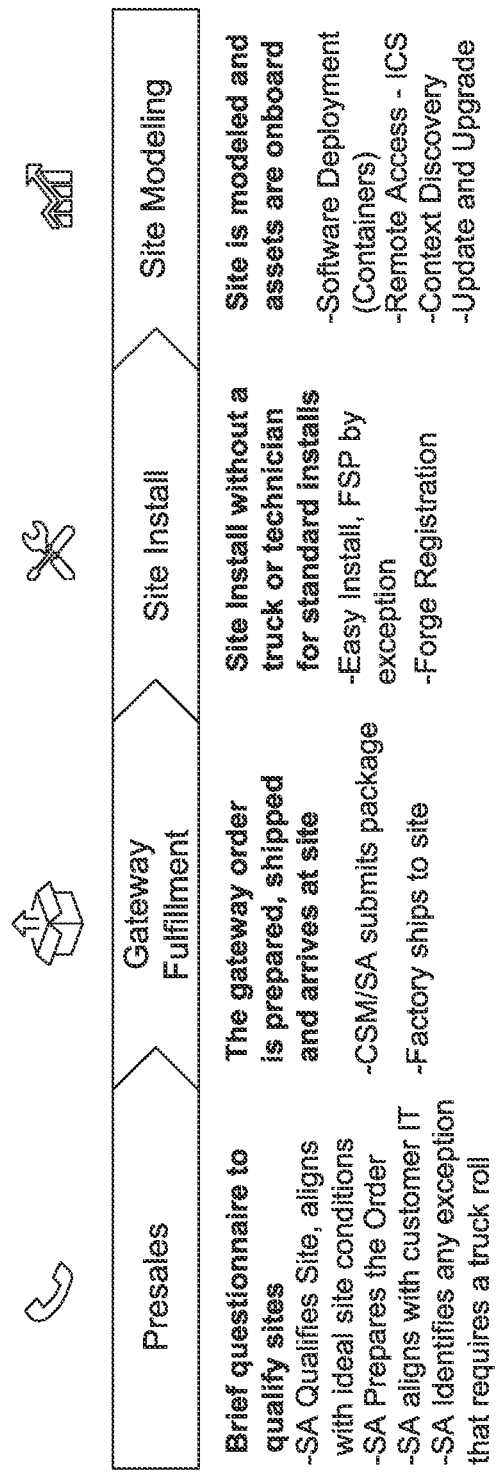
FIG. 24 shows an example on-boarding processes for a facility.

Further, in accordance with said example embodiment, once communication is established between a remote technician and the edge controller, the remote technician completes a software service deployment to the edge controller, as indicated at block 62. The remote technician does not need to be at the facility 12 but can instead access the edge controller remotely (as indicated by the Offsite Access block 40 shown in FIG. 3). In some cases, the remote technician sets up a tunnel (i.e. a secured communication channel) through the firewall at the facility 12 (such as the firewall 34 of FIG. 3), as indicated at block 64. In an example, any data transaction through the edge controller 16 can happen through this tunnel. This can include utilizing the Security Center block 44 of FIG. 3). In the example shown, the remote technician completes site modeling, remote history, and dashboard validation, as indicated at block 66. In some embodiments, this can include BMS data configuration. An example on-boarding processes for a facility is shown in FIG. 24.

Figure 5:
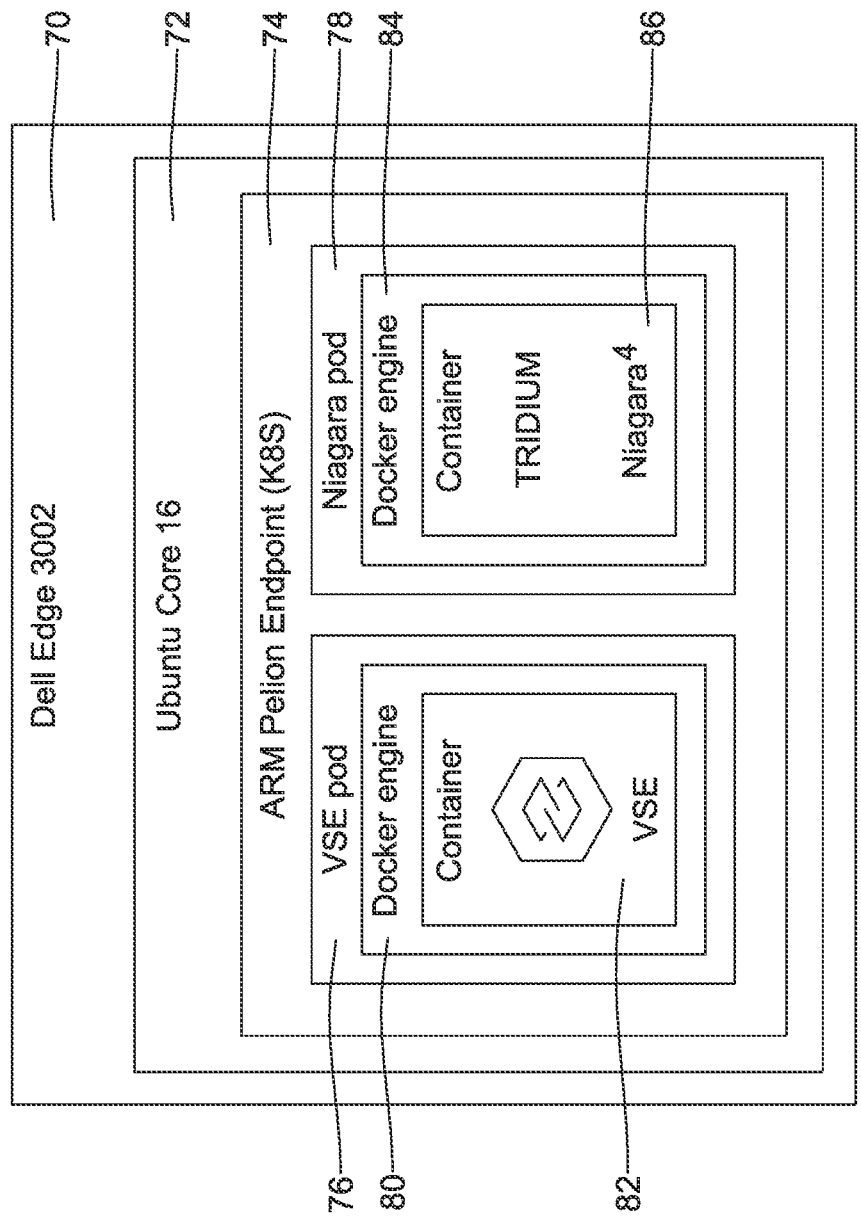
FIG. 5 is a schematic block diagram showing an example of edge controller, in accordance with an example embodiment.

FIG. 5 is a schematic block diagram of an illustrative edge controller 68. The edge controller 68 may be considered as being an example of the edge controller 16. In an embodiment, the edge controller 68 is a container-based controller that includes a physical device 70. As described herein, the edge controller 16 can include one or more containerized packages that are configured to managing various operations associated with assets in a facility. FIG. 5 describes an example of such edge controller which include one or more containerized packages. In an embodiment, the physical device 70 is a gateway that is configured to execute an operating system 72. In an embodiment, the operating system 72 is an Ubuntu Core operating system that is configured to execute an ARM Pelion endpoint 74. In an embodiment, the ARM Pelion endpoint 74 is configured to execute one, two or more different containers. As shown, there is also a virtual security engine (VSE) pod 76 and a Niagara pod 78. The VSE pod 76 includes a Docker runtime engine 80 that is executing a VSE container 82. The Niagara pod 78 includes a Docker runtime engine 84 that is executing a Niagara container 86. The edge controller 68 represents an edge controller that is configured (has downloaded appropriate software) to work with a facility having a Niagara network. If the facility has a different type of network, or has several different types of networks, the edge controller 68 will have different pods running within the ARM Pelion endpoint 74. If the facility includes a BACnet network, for example, then the edge controller 68 will include a BACnet pod (not shown). The technologies like Ubuntu, ARM, and Niagara are some examples supported by the edge controller 68. However, as can be appreciated, the edge controller 68 is configured to support other technologies also for containerization of packages including applications and executable files for various performing operations as described herein.

Figure 6:
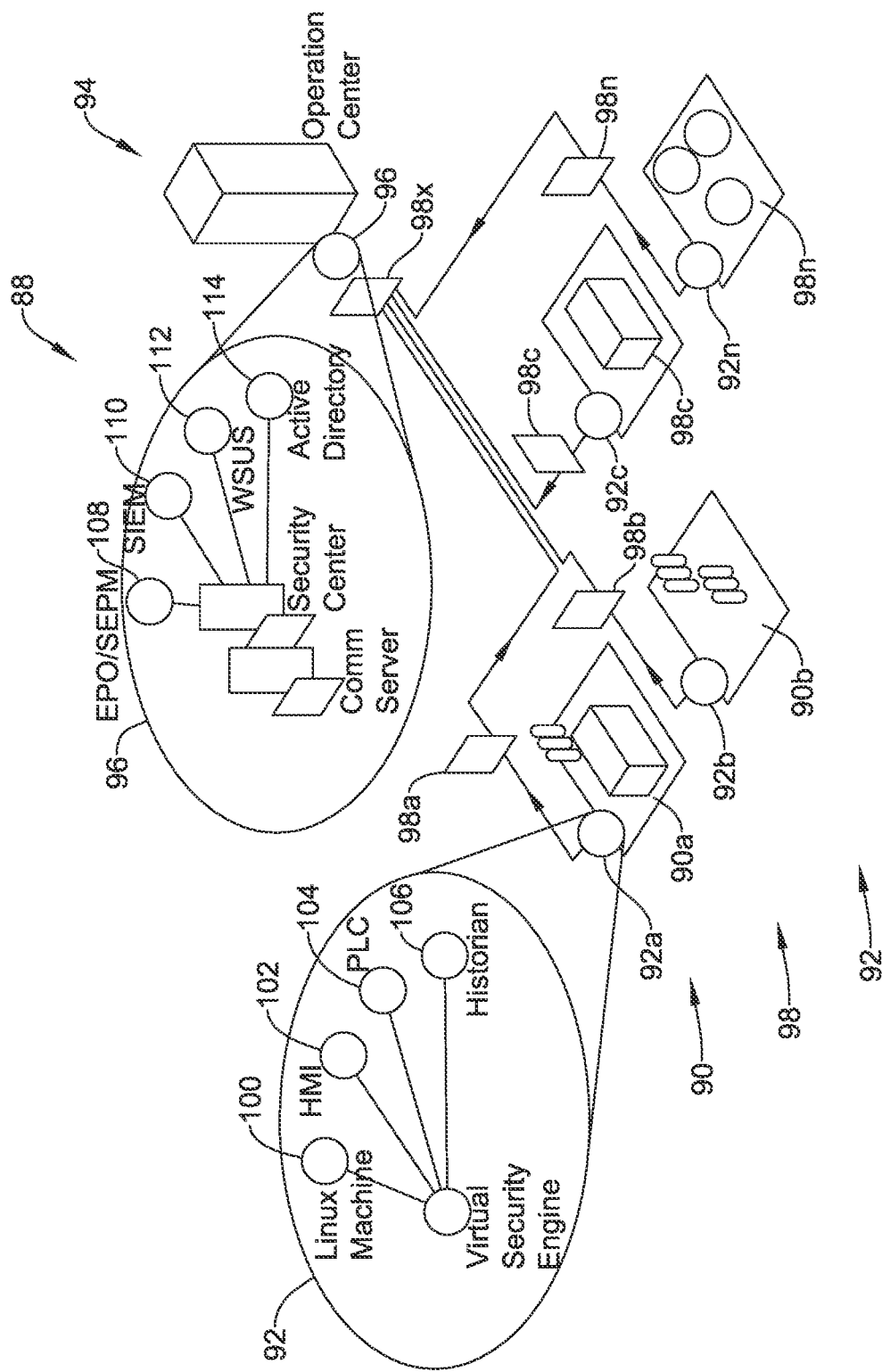
FIG. 6 is a schematic diagram of an example facility management system, in accordance with an example embodiment.

FIG. 6 is a schematic diagram of an illustrative Facility Management system 88. The Facility Management system 88 includes a number of plants 90, individually labeled as 90a, 90b, 90c, through 90n. Each plant 90 may be geographically distanced. In an embodiment, each plant 90 may represent one of the facilities 12 shown in FIGS. 1-3. In this example, each plant 90 has a VSE (virtual security engine) 92, individually labeled as 92a, 92b, 92c, through 92n. As will be discussed, the VSE 92 of each plant 90 can be used to facilitate communication with an operation center 94, which itself includes a security center 96. It will be appreciated that there is a firewall 98, individually labeled as 98a, 98b, 98c through 98n upstream of each of the VSEs 92, as well as a firewall 98x downstream of the security center 96. In some embodiments, the VSEs 92, in combination with the security center 96, enable tunneling through the firewall 98 without requiring separate access to penetrate the firewall 98. In some embodiments, the communication enabled by the VSEs 92a-93n in combination with the security center 96 is one-way (e.g. out-going from each plant to the security center 96). For example, information can flow upstream, towards the security center 96, but no information can flow downstream, away from the security center 96.

As can be seen, each VSE 92 includes a Linux machine 100 that executes appropriate software to provide the functionality of the VSE 92. The VSE's 92 includes an HMI (human machine interface) module 102, a PLC (programmable logic controller) 104 and an Historian 106. The security center 96 includes an EPO/SEPM (e-policy orchestrator or Symantec endpoint protection) module 108, an SIEM (security information and event management) module 110, a WSUS (Windows server update services) computer program and network service module 112 and an Active Directory 114.

Figure 7:
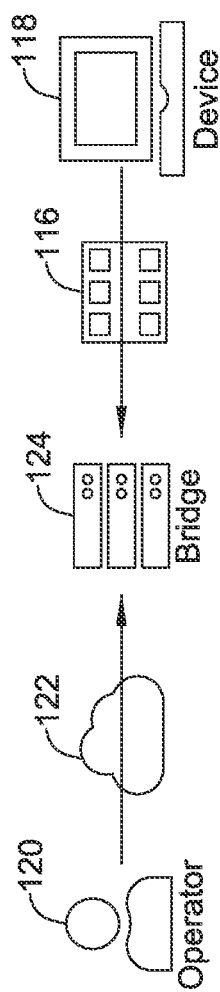
FIG. 7 is a schematic diagram showing a method of transacting data through a secured communication channel, in accordance with an example embodiment.
Figure 8:
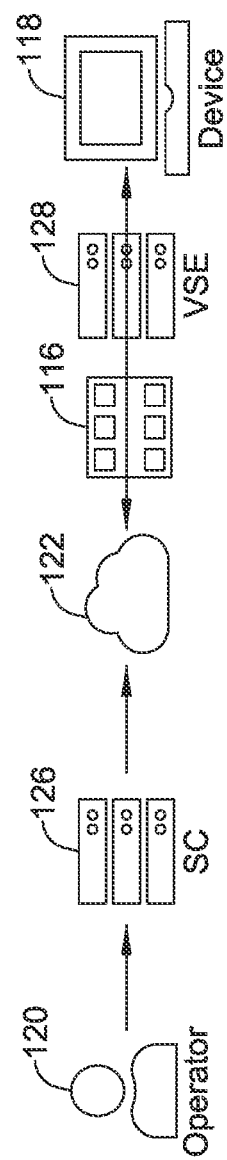
FIG. 8 is a schematic diagram showing a method of transacting data through a secured communication channel, in accordance with another example embodiment.
Figure 9:
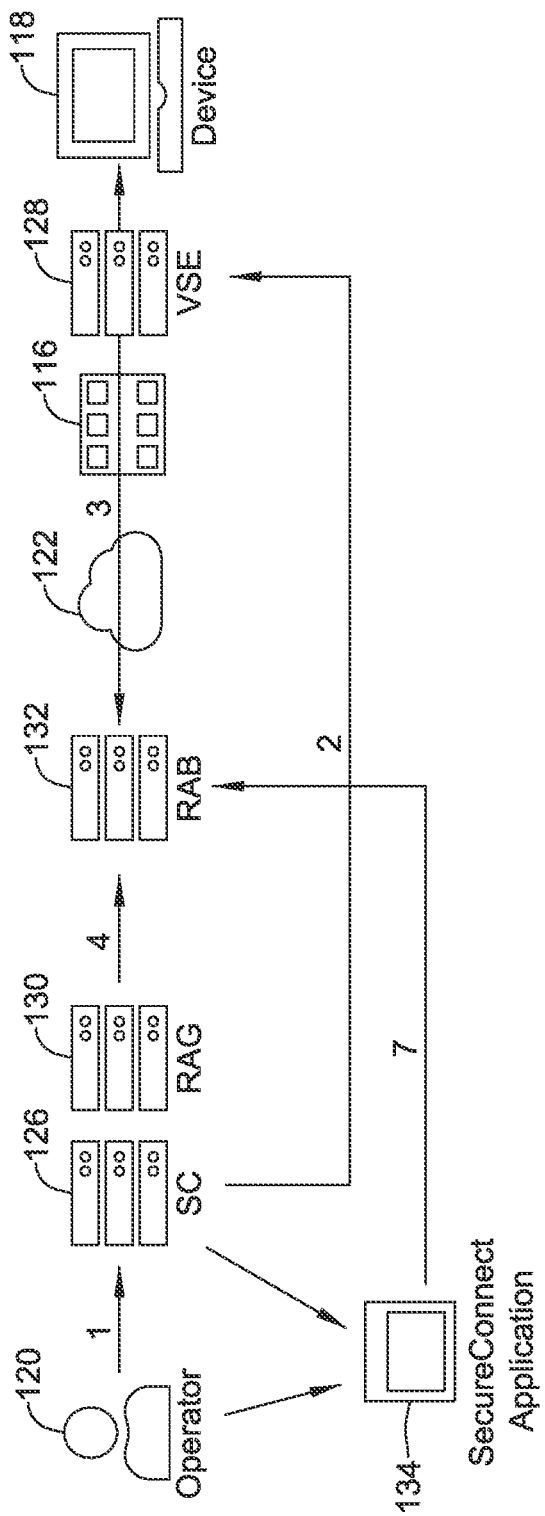
FIG. 9 is a schematic diagram showing a method of transacting data through a secured communication channel, in accordance with another example embodiment tunneling.

FIGS. 7 through 9 are schematic diagrams showing ways of tunneling through a firewall such as the firewalls 34, 98. In FIG. 7, a firewall 116 sits in front of a device 118. In an embodiment, the device 118 is a controller such as the controllers 22, 26 of FIG. 2. An operator 120 desires to access information within the device 118. The operator 120 is able to access a bridge 124 via a cloud 122. In some embodiments, a connection between the cloud 122 and the device 118 is possible due to a request from the operator 120 reaching the bridge 124 in combination with the device 118 reaching out through the firewall 116.

In FIG. 8, a security center 126 can be seen positioned between the operator 120 and the cloud 122. A VSE (virtual security engine) 128, which may be considered as being an example of the VSEs 92 of FIG. 6) is positioned between the firewall 116 and the device 118. In an embodiment, the VSE 128, in combination with the security center 126, enables a tunnel to be created through the firewall 116, thereby allowing the operator 120 to obtain information from the device 118.

In FIG. 9, a RAG (remote access gateway) 130 and an RAB (remote access bridge) 132 can be seen positioned between the operator 120 and the cloud 122. In order to create a tunnel through the firewall 116, the operator 120 makes a request (labeled as 1) to the security center 126. The security center 126 makes a request (labeled as 2) to the VSE 128. The VSE 128 makes a request (labeled as 3) to the RAB 132. The RAG 130 makes a request (labeled as 4) to the RAB 132. At the same time, the security center 126 makes a request (labeled as 5) to a Secure Connect application 134 and the operator 120 makes a request (labeled as 6) to the Secure Connect application 134. In response, the Secure Connect application 134 makes a request (labeled as 7) to the RAB 132.

Figure 10:
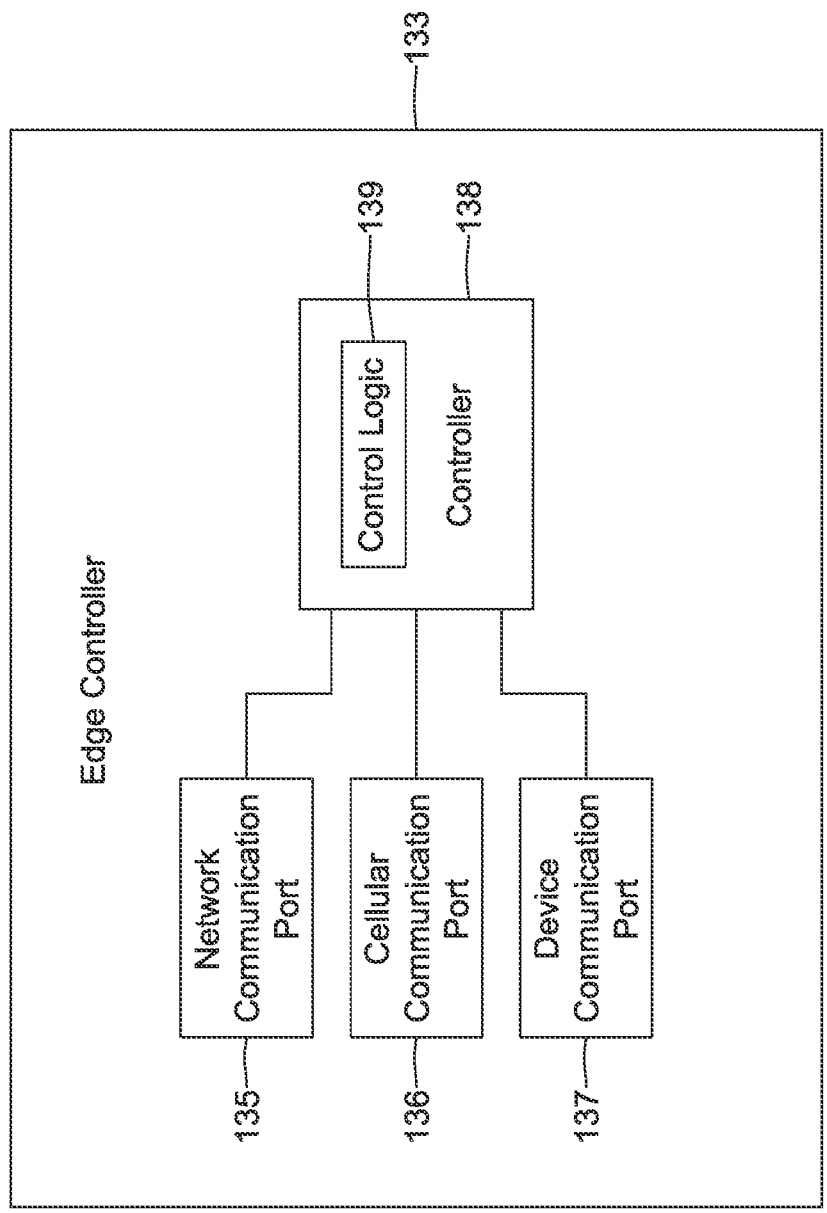
FIG. 10 is a schematic block diagram showing an example of an edge controller, in accordance with an example embodiment.

FIG. 10 is a schematic block diagram of an edge controller 133 for obtaining device data from one or more local devices 20, 24 at a local facility 12 as well as providing a representation of at least some of the device data to the cloud 14. The edge controller 133 may be considered as being an example of the edge controller 16 shown in FIG. 1 or the edge controller 68 shown in FIG. 5. The edge controller 133 includes a network communication port 135 for communicating with the cloud 14 when the network communication port 135 is activated. The illustrative edge controller 133 also includes a cellular communication port 136 for communicating with the cloud 14 through a cellular communication network when the cellular communication port 136 is activated. The illustrative edge controller 133 also includes a device communication port 137 for communicating with one or more of the local devices 20, 24 at the local facility 12. While communication ports 135, 136, 137 are shown in FIG. 10, it is contemplated that all are not required in all embodiments.

The edge controller 133 includes a controller 138 that is operatively coupled to the network communication port 135, the cellular communication port 136 and the device communication port 137. The controller 138 receives configuration information over the cellular communication port 136 and installs the received configuration information on the edge controller 133. The installed configuration information configures the controller 138 of the edge controller 133 to obtain the device data from the one or more local devices 20, 24 and to send a representation of at least some of the device data to the cloud 14. In some embodiments, the configuration information, once installed, configures the controller 138 to establish communication with the cloud 14 via the network communication port 135. In some embodiments, the configuration information includes one or more commands, and the controller 138 is configured to execute the one or more commands. In some cases, the configuration information may spawn and/or configure one or more of virtual controllers on the edge controller 133. In some cases, the one or more virtual controllers may be configured to obtain the device data from the one or more local devices, format, filter and/or perform analytics on the device data and send a representation of at least some of the device data to the remote server. A virtual controller, if implemented, may be defined by a virtual controller image, and wherein the configuration information may include the virtual controller image.

In some cases, the controller 138 may include control logic 139 that at least selectively provides closed loop control over a function of one or more of the local devices 20, 24, and is configured to receive and execute control commands provided by the cloud 14 for controlling one or more of the local devices 20, 24. In some cases, the control logic may be implemented as part of one or more virtual controllers spawned on the edge controller 133. In some embodiments, closed loop control may be implemented in a chiller plant, using an understanding of system dynamics and cooling demands in a particular building, both of which may be learned from the device data that is sent over time to the cloud 14. Closed loop control may include resetting chilled water supply temperatures and delta pressure set points, for example.

The configuration information may define at least in part the representation of at least some of the device data that is sent to the cloud 14. In an embodiment, the device data obtained from the local devices 20, 24 includes a plurality of data items each having a data item format, and wherein the configuration information defines which of the plurality of data items are used in constructing the representation of at least some of the device data that is sent to the cloud 14. In some cases, the configuration information defines a data format for the representation of at least some of the device data that is sent to the cloud 14. The configuration information may define one or more local data analytics executed by the controller 138 that are used to produce the representation of at least some of the device data that is sent to the cloud 14. In some embodiments, one or more local data analytics may include one or more of processing at least some of the device data (e.g. calculate average, mean, standard deviation, etc.), filtering at least some of the device data to only send meaningful data, formatting at least some of the device data, and parsing at least some of the device data. In some cases, it is desirable to reduce the amount of data sent to the cloud 14 to reduce bandwidth requirements, while still allowing the cloud 14 to perform its desired function.

In some cases, data exiting the local devices 20, 24 may be in particular formats that are governed or otherwise dictated by the architecture of the particular local devices 20, 24. In some embodiments, the controller 138 of the edge controller 133 may translate or otherwise modify the data such as telemetry data received from the local devices 20, 24 into a standard format for uploading to the cloud 14. In some embodiments, the facility 12 may include a separate gateway such as a Niagara gateway that performs a first translation of the data for the edge controller 68, such as into a Niagara compatible format. The edge controller 68 may receive the first translated data from the Niagara gateway and perform a second translation of first translated data for the cloud 14, and in particular for the Facility Management block 46 that resides within the cloud 14. Accordingly, the edge controller 68 may push the data based on the second translation to the cloud 14.

Figure 11:
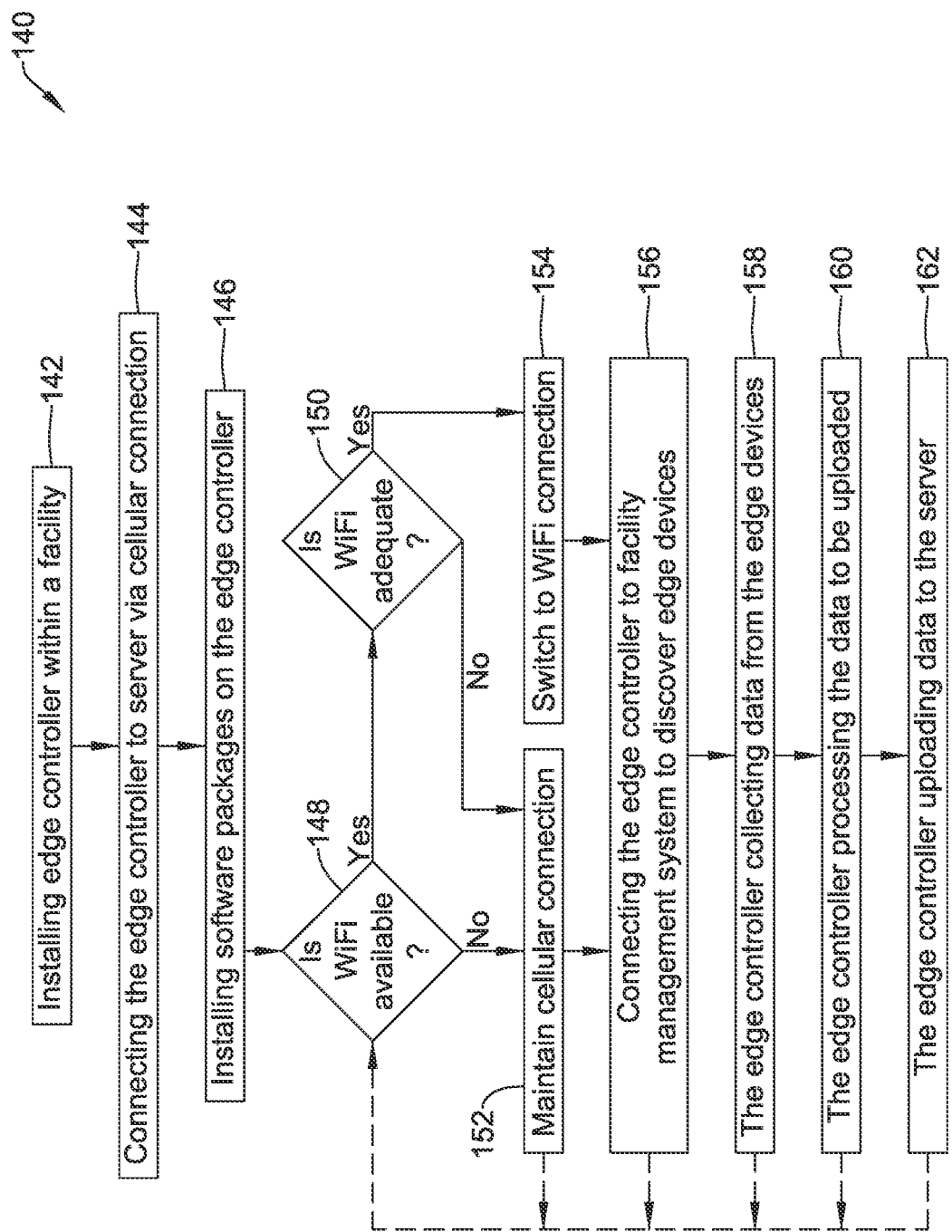
FIG. 11 is a flow diagram showing an illustrative method of commissioning the edge controller in a facility, in accordance with an example embodiment.
Figure 12:
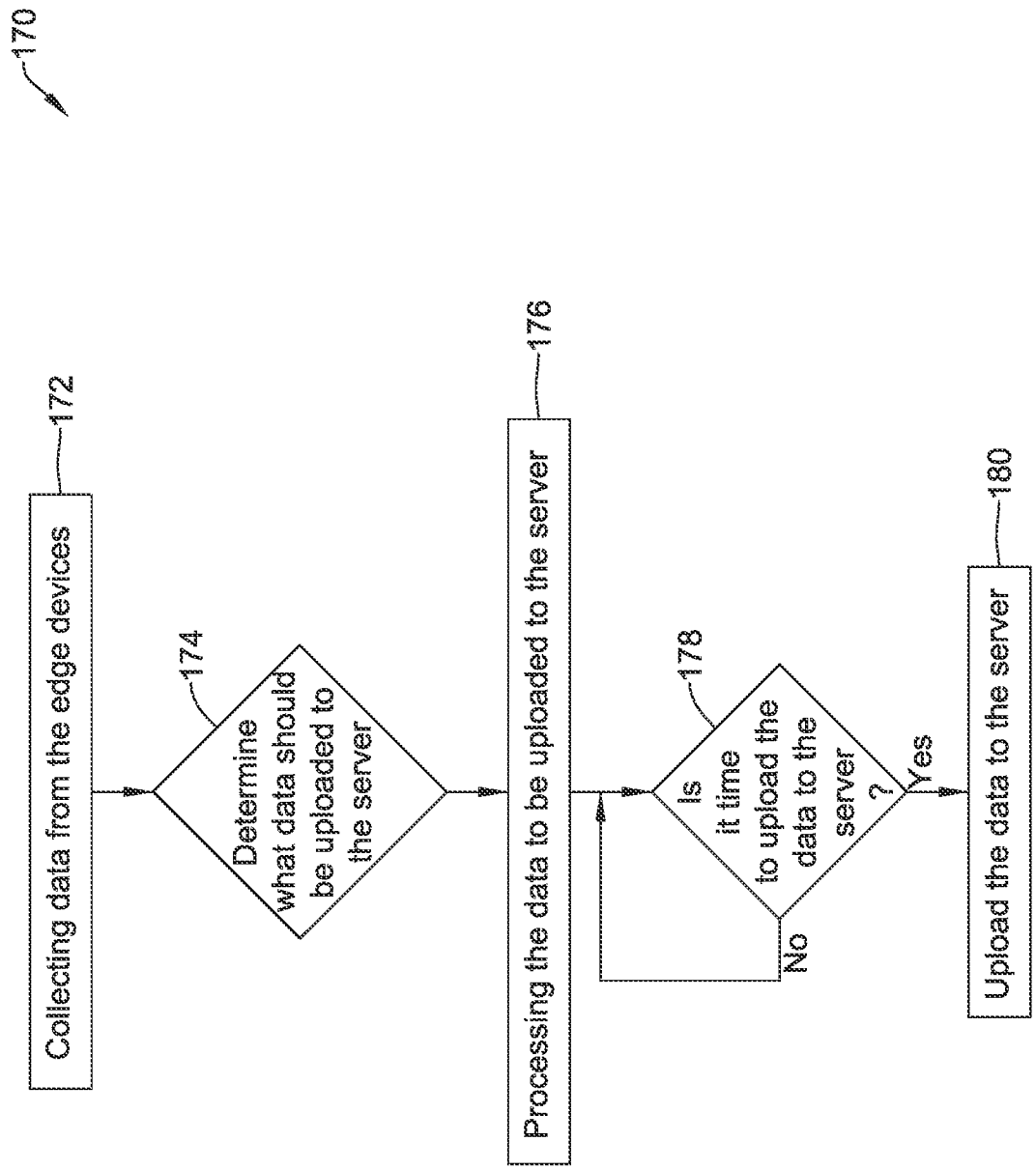
FIG. 12 is a flow diagram showing an illustrative method of uploading edge device data by the edge controller, in accordance with an example embodiment.
Figure 13:
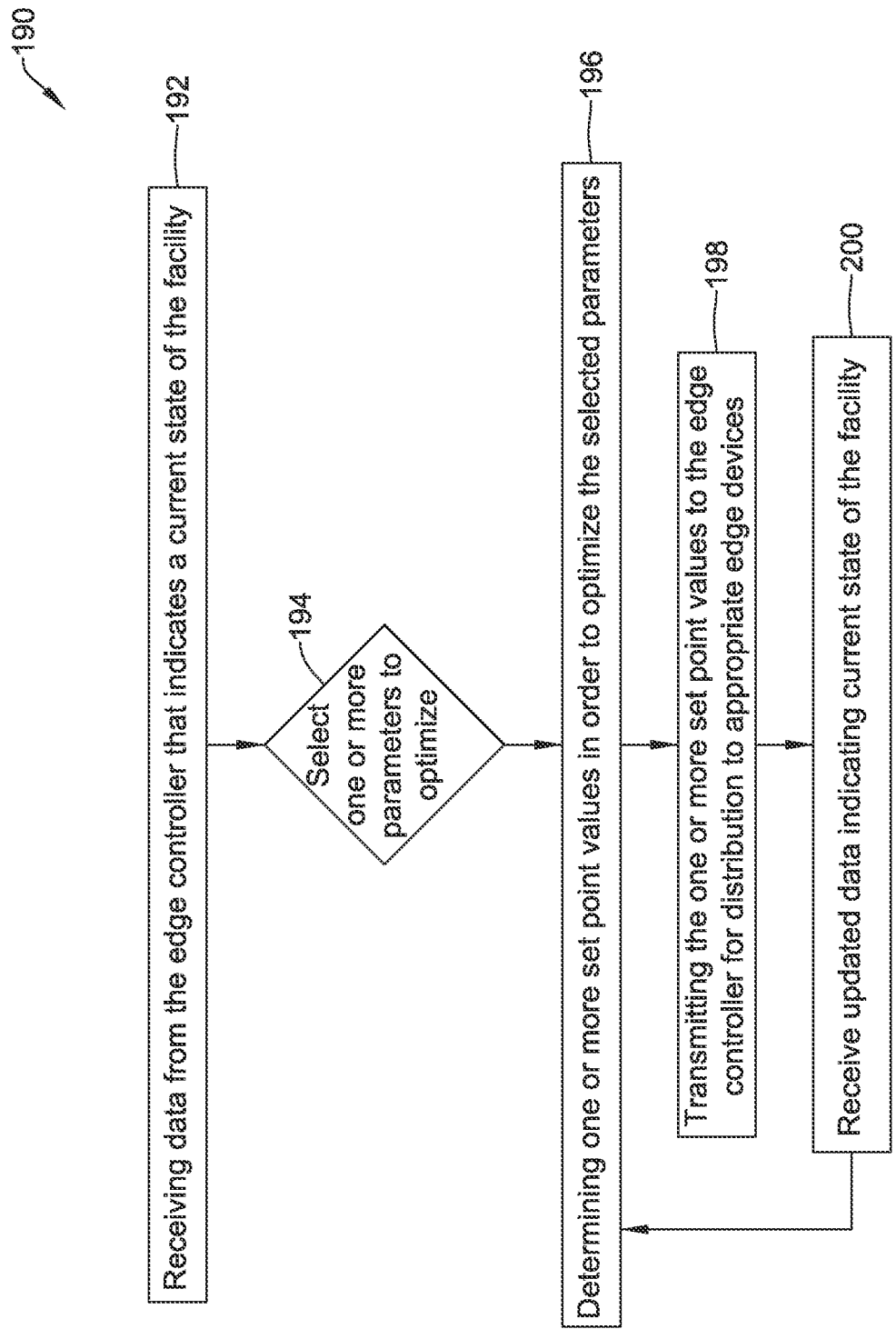
FIG. 13 is a flow diagram showing a method of closed-loop control for assets in a facility using the edge controller, in accordance with an example embodiment.

FIGS. 11 through 13 provide details regarding setup and initiation of the edge controller 16, 68, 133. FIG. 11 is a flow diagram showing an illustrative method 140 for installing the edge controller (such as the edge controller 16, 68, 133) in a facility such as the facility 12. The edge controller is installed at a facility, as indicated at block 142. Installing the edge controller at the facility includes connecting the edge controller to a source of power. In an embodiment, installing the edge controller at the facility may include connecting an Ethernet cable for subsequent wired network access. In some embodiments, the edge controller may not utilize a wired connection, but may ultimately be connected wirelessly via a Wi-Fi connection once the edge controller is provided a port through a facility firewall. Initially, and as indicated at block 144, the edge controller is connected to a remote server (such as the cloud 14) via a cellular connection generated by the edge controller. It will be appreciated that connecting to the remote server via a cellular connection that is generated by the edge controller provides the edge controller with immediate access to the remote server without needing to wait for a technician to configure a wireless or wired connection through the facility's firewall.

Once the cellular connection has been established, one or more software packages are downloaded from the remote server to the edge controller, and are installed on the edge controller, as indicated at block 146. The software packages may include, for example, one or more virtual controllers implemented as containers or the like. The software packages may configure the edge controller for the particular application at hand. In an embodiment, the edge controller periodically checks to see if a Wi-Fi connection is available, as indicated at decision block 148. Determining that a Wi-Fi connection is available includes detecting that an appropriate port has been opened through the facility's firewall. In other embodiments, determining that a Wi-Fi connection is available may include a Wi-Fi radio within the edge controller detecting the presence of an available Wi-Fi network, regardless of whether the presence of the available Wi-Fi network a result of a firewall port is being opened, a Wi-Fi network being established within the facility, or any other reason. While the decision block 148 is illustrated as being immediately downstream to the block 146, it will be appreciated that this is merely illustrative. In some embodiments, the edge controller periodically checks for an available Wi-Fi network.

If the edge controller determines at the decision block 148 that Wi-Fi is available, control passes to a decision block 150. As indicated by the decision block 150, the edge controller determines whether the available Wi-Fi is adequate for use by the edge controller. In an embodiment, this determination is based at least in part upon whether the available Wi-Fi provides sufficient bandwidth for the needs of the edge controller in downloading software packages, uploading data and/or downloading control commands from the remote server. In other embodiments, this determination may include other factors such as but not limited to Wi-Fi signal stability, signal strength and the like. Like the decision block 148, the decision block 150 does not represent a one-time decision but rather represents an ongoing periodic check.

If the edge controller determines at the decision block 148 that there is no Wi-Fi availability, or if the edge controller determines at the decision block 150 that any available Wi-Fi network is not adequate for the needs of the edge controller, control passes to block 152, where the edge controller maintains the cellular connection between the edge controller and the remote server. If the edge controller determines at the decision block 150 that the available Wi-Fi network is adequate, the edge controller switches to a Wi-Fi connection, as indicated at block 154. In an embodiment, switching to a Wi-Fi connection includes activating the network communication port 135 (FIG. 10) and deactivating the cellular communication port 136.

Control then passes to block 156, where the edge controller is connected to a Facility Management system. In an embodiment, the edge controller discovers the edge devices, such as the local devices 20, 24 shown in FIG. 2. The edge controller collects data from the edge devices, as indicated at block 158. In an embodiment, the edge controller processes the data that the edge controller receives from the edge devices, as indicated at block 160. Processing the data may include receiving data in multiple formats, from a variety of different edge devices that may be provided from differing manufacturers and translating or otherwise converting the data into a format (e.g. uniform or common format) appropriate for transmission to the remote server. In an embodiment in which there is no remote server, processing the data includes translating or otherwise converting the data into a format appropriate for use by the edge controller itself. The processed data is uploaded to the remote server, as indicated at block 162.

FIG. 12 is a flow diagram showing an illustrative method 170 illustrating how data is parsed by the edge controller once the edge controller is in operation receiving data from the edge devices and uploading data to the cloud. The illustrative method 170 may be considered in some ways to represent next steps subsequent to those shown in FIG. 11. In an embodiment, the edge controller collects data from the edge devices, as indicated at block 172. At decision block 174, the edge controller 16, 68 determines a portion of the data that should be uploaded to the server (e.g. the cloud 14). In some embodiments, this includes, for example, selecting data for uploading based at least in part upon a subscription rule for an application on the server. The subscription rule can define a type of data for which the application is subscribed in a pre-defined context. In some embodiments, the edge controller may receive types of data from some edge devices that the server does not need or want. In some cases and depending on what process parameters the server will need to operate closed loop control over the edge devices (as discussed in further detail with respect to FIG. 13), some data may simply not be needed by the server. As described herein in reference to utilization of the EOM, in some cases the edge controller 16 is configured to selectively provide the data (i.e. the telemetry data, the model data) and/or any common object model associated with the data to the cloud 14. In this regard, in some examples, the edge controller 16 is configured to selectively pull data from the assets of the facility.

Control passes to block 176, where the edge controller processes the data that will be uploaded to the server. In some embodiments, processing the data includes deciding what data to transmit. It will be appreciated that depending on the particular facility the data is coming from, there may be an immense volume of data, and it may not be feasible to simply transmit everything. In some cases, the data is processed to create various representative values such as means, medians, modes, averages, moving averages, standard deviations and/or other statistical parameters that help to explain and/or characterize the received data. The data may be processed to detect trends in the data, and only information identifying the detected trends may be uploaded. In some embodiments, at least some of the data processing may actually occur within the edge devices, which can reduce the total volume of data that is even received by the edge controller, much less uploaded to the remote server.

Control passes to decision block 178, where the edge controller decides whether it is time to upload data to the server. In an example embodiment, data may be uploaded to the server in accordance with a predefined schedule. In another example embodiment, data may be uploaded to the server any time that one or more of the parameters represented by the data changes more than a particular or predefined amount, or any time one of the parameters exceeds (or drops below) a particular or predefined threshold. If the edge controller determines that it is time to transmit data, control passes to block 180 and the data is uploaded to the server. Otherwise, the edge controller continues to check to see if it is time to transmit data.

FIG. 13 is a flow diagram showing an illustrative method 190 of implementing closed loop control. The illustrative method 190 may be considered in some ways to represent next steps subsequent to those shown in FIG. 12. At block 192, data is received from the edge controller that provides an indication of the current state of the facility, or an indication of the current state of one or more of edge devices deployed within the facility. At decision block 194, a determination is made as to which one or more parameters out of a plurality of parameters are to be optimized. In an embodiment, suitable parameters include one or more of energy optimization for a facility (e.g. a building site), predictive maintenance associated with assets of a facility (e.g. avionic subsystems in an aircraft, or subsystem and components in an industrial plant), profitability associated with operations of a facility, user comfort associated with a building facility, fuel savings associated with operations of an aircraft, underutilized facility space, occupant experience, optimal utilization of raw ingredients or intermediate products (such as in an oil refinery) and the like for an industrial site. In an embodiment, a remote server determines which one or more parameters to optimize. In some embodiments, the particular parameters that are selected for optimization may change over time.

Responsive to determining which one or more parameters to optimize, a determination is made as to one or more set point values, as indicated at block 196. These are set point values that will be transmitted to the edge controller, and thus to the appropriate edge devices, in order to control the appropriate edge devices to optimize the selected one or more parameters. At block 198, the set point values are transmitted to the edge controller for distribution to the appropriate edge devices. It will be appreciated that closed loop control means that the edge devices will provide updated data indicating the current status of the facility, or the current status of individual edge devices within the facility periodically so that set point values can be varied as appropriate to optimize the selected parameter(s), as indicated at block 200. The cycle continues on any appropriate cadence. In one embodiment, updated data indicating current status and subsequent determination of new set point values in order to optimize the selected parameter(s) occurs every 15 seconds, or every 15 minutes. Between these update times, the edge controller and/or edge devices may implement a local control loop that controls the facility in accordance with the current set point value(s).

As a result of the methods 140, 170, 190 shown in FIGS. 11 through 12, and recognizing that there is some overlap between each of the methods 140, 170, 190, a building, industrial process or aircraft fleet manager is able to achieve a unified picture. Previously, this has been difficult or even impossible to achieve due to the need to compile data from a variety of disparate devices that provide prodigious amounts of data in a variety of different formats. The combination of technology described herein provides solutions not previously available to building or aircraft fleet owners.

Figure 14:
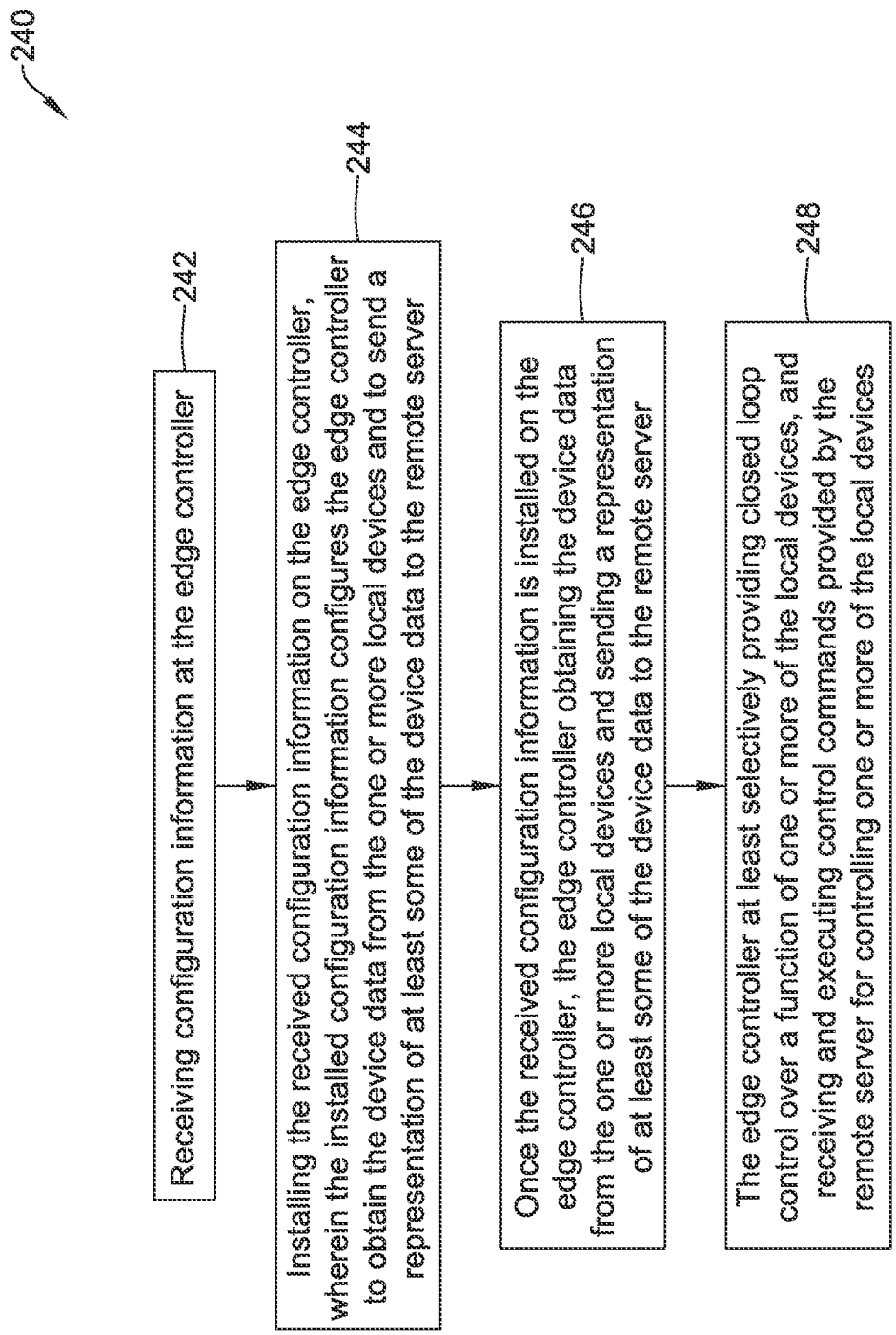
FIG. 14 is a flow diagram showing an illustrative method of closed-loop control for assets in a facility using the edge controller, in accordance with another example embodiment.

FIG. 14 is a flow diagram showing an illustrative method 240 of closed loop control for assets in a facility, in accordance with an example embodiment. In an example embodiment, the method 240 can include obtaining device data using an edge controller (such as the edge controller 16, 68, 133) from one or more local devices (such as the local devices 20, 24) at a local facility (such as the facility 12) and providing a representation of at least some of the device data to a remote server (such as the cloud 14). Configuration information is received at the edge controller, as indicated at block 242. In an embodiment, configuration information may be received at the edge controller over a cellular communication port of the edge controller, particularly when the network communication via the network communication port has not yet been configured and/or otherwise established to the remote server.

The received configuration information is installed on the edge controller, wherein the installed configuration information configures the edge controller to obtain desired device data from the one or more local devices and to send a representation (e.g. a common object model) of at least some of the device data to the remote server, as indicated at block 244. Once the received configuration information is installed on the edge controller, the edge controller obtains the device data from the one or more local devices and sends a representation (e.g. common object model) of at least some of the device data to the remote server, as indicated at block 246. In an example, as described herein, the edge controller can normalize the data into a unified format, before sending it to the remote server. In an embodiment, representation of at least some of the device data may be sent to the remote server over the cellular communication port of the edge controller or the network communication port.

In some embodiments, the edge controller may at least selectively provide closed loop control over a function of one or more of the local devices. In an example embodiment, the edge controller can perform the closed loop control based on the configuration information received from the remote server. In an example embodiment, as described herein, the edge controller may receive the configuration information from the remote server based on analyzing of the EOM and/or the common object model by the remote server. In some embodiments, the edge controller executes control commands provided by the remote server for controlling one or more of the local devices, as indicated at block 248. In some embodiments, the edge controller implements a virtual controller, wherein the virtual controller includes one or more virtual containers or virtual machines, and wherein the virtual controller is defined by a virtual controller image. In some embodiments, the configuration information downloaded to the edge controller from the remote server includes the virtual controller image.

Figure 15:
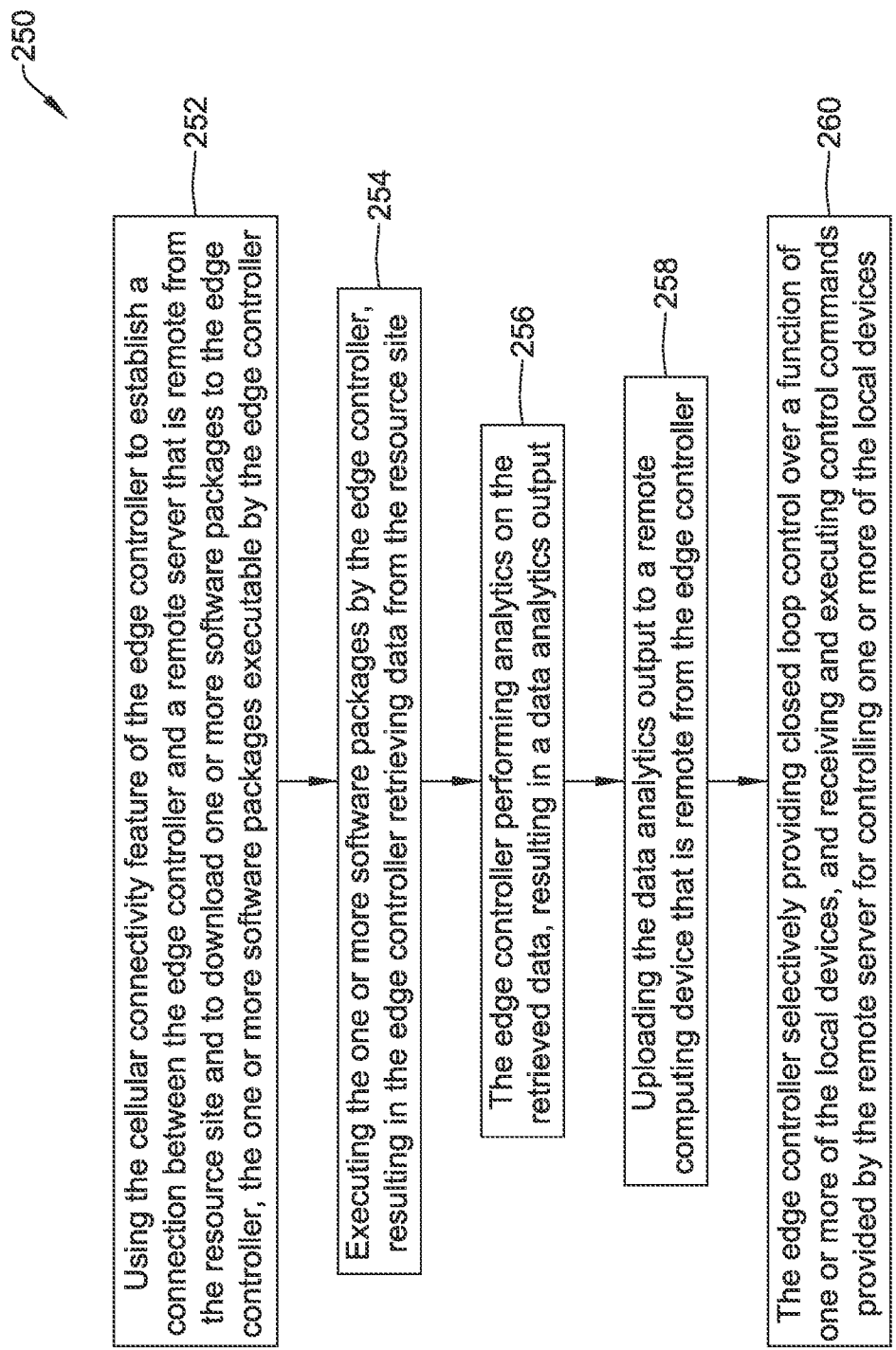
FIG. 15 is a flow diagram showing an illustrative method carried out by the edge controller, in accordance with an example embodiment.

FIG. 15 is a flow diagram showing an illustrative method 250 carried out by the edge controller (16, 68, 133), in accordance with an example embodiment. In an example, the method can include remotely obtaining data from a resource located at a resource site (such as the facility 12), the resource operably coupled with an edge controller (such as the edge controller 16, 68, 133) disposed at the resource site that is itself operably coupled with a local network (such as the network 18). In this example, the edge controller includes a cellular connectivity feature. The cellular connectivity feature of the edge controller is used to establish a connection between the edge controller and a remote server that is remote from the resource site, and to download configuration information, which in some embodiments may include one or more software packages, to the edge controller, as indicated at block 252. In some embodiments, the one or more software packages include a virtual controller image that defines a suitable virtual controller. The one or more software packages, when executed, cause the edge controller to retrieve data from the resource site, as indicated at block 254. The edge controller may then perform analytics on the retrieved data, resulting in a data analytics output, as indicate at block 256. The data analytics output may be uploaded to a remote computing device that is remote from the edge controller, as indicated at block 258. While not required, the edge controller may also selectively provide closed loop control over a function of one or more of the local devices and receive and execute control commands provided by the remote server for controlling one or more of the local devices, as indicated at block 260.

Figure 16:
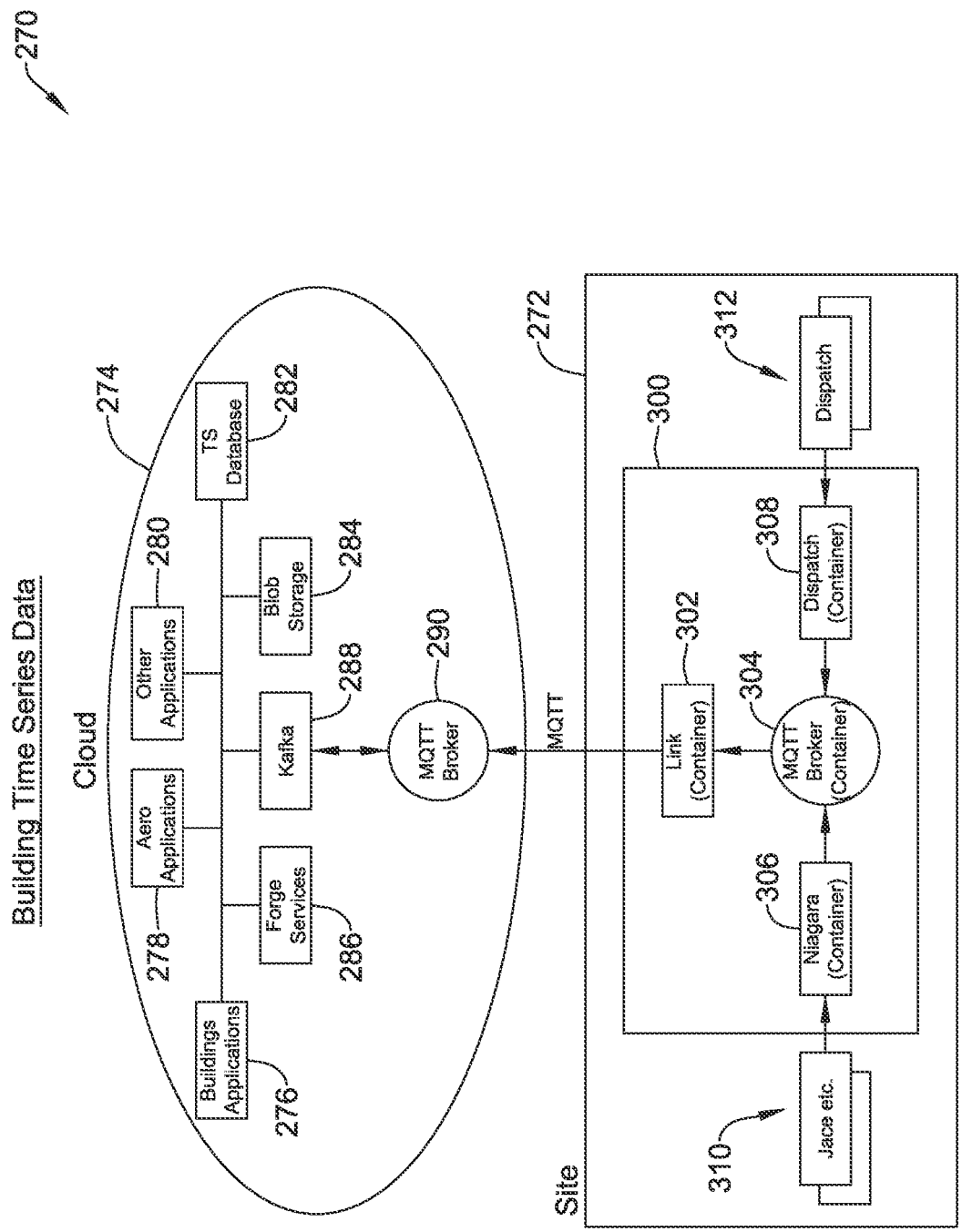
FIG. 16 is a schematic block diagram of an illustrative data management system comprising an edge controller, in accordance with an example embodiment.

FIG. 16 is a schematic block diagram of an illustrative data management system 270. In an embodiment, the illustrative data management system 270 includes a site 272 and a cloud 274. The site 272 may be considered as being representative of the facility 12, for example. In an embodiment, the cloud 274 is a cloud-based server that is representative of the cloud 14. In other embodiments, the cloud 274 may represent a single cloud-based server or may represent two or more servers that work together to provide all of the functionality within the cloud 274. In some embodiments, the cloud 274 may be considered as being configured to communicate with any of a variety of different types of sites 272, such as but not limited to buildings, process control, aero and the like.

In the example shown, the cloud 274 includes a number of different applications or modules. As illustrated, the cloud 274 includes a Building Applications module 276, an Aero Applications module 278, and a generic Other Applications module 280. The cloud 274 includes a TS Database 282, a Blob Storage module 284, a Services module 286, a Kafka module 288 and an MQTT Broker module 290. It will be appreciated that each of the modules 284, 286, 288 and 290 are merely illustrative, and are not intended to be limiting in any fashion as any equivalent modules are contemplated as well. The Blob Storage module 284 provides data storage capabilities, and may include Microsoft® Azure Blob storage, which permits storage of unstructured data within Microsoft's cloud platform. The Kafka module 288 pertains to data streaming and may include Apache Kafka, which provides a unified, high-throughput, low-latency platform for handling real-time data feeds. The MQTT Broker module 290 serves as a go-between between the cloud 274 and the site 272. The MQTT Broker module 290 receives all messages from sites and then routes the messages to the appropriate destination client. To illustrate, any data incoming to the cloud 274 passes through the MQTT Broker module 290 before being passed to one or more appropriate modules within the cloud 274. Similarly, any data outgoing from the cloud 274 passes through the MQTT Broker module 290 before being downloaded to the site 272.

The site 272 includes an edge gateway controller 300. The edge gateway controller 300 may be considered as being an example of the edge controller 16, 68, 133. The edge gateway controller 300 includes a Link container 202 that serves as a clearinghouse for messages and other data passing between the edge gateway controller 300 and the cloud 274. The edge gateway controller 300 includes an MQTT broker 304. The illustrative data management system 270 is configured to work with any of a variety of different types of facilities. Accordingly, the edge gateway controller 300 may be considered as a "blank slate" that is capable of running any of a variety of different Docker containers (or virtual machines) that are customized to the site 272. In some embodiments, the edge gateway controller 300 may use ARM's Pelion Edge framework as a distributed Docker container host. The Pelion Edge framework may be used on a variety of Commercial Off-The-Shelf (COTS) gateways as well as on custom-built edge gateway hardware as long as there is support for Linux and adequate storage capabilities and processing power. This allows the edge gateway controller 300 to be scaled up or down, depending on the needs of a particular site 272.

In the example shown, a Niagara framework container 306 is used to collect data from many different building management systems. The Niagara framework container 306 is configured to normalize data from over two hundred different building management system protocols into a common format suitable for the cloud 274. It will be appreciated that if the site 272 includes devices on a network other than a Niagara network, then the Niagara framework container 306 would be supplemented with or replaced by a different type of network framework container. A Matrikon Dispatch container 308 is used for collecting and normalizing industrial process data in an Open Packaging Conventions (OPC) format typically used in that industry. Another container (not shown in this drawing) is used to collect and normalize aircraft data. As shown, the Niagara framework container 306 is able to communicate with a JACE and other devices 310 while the Dispatch container 308 is able to communicate with a Dispatch and other devices 312.

Figure 17:
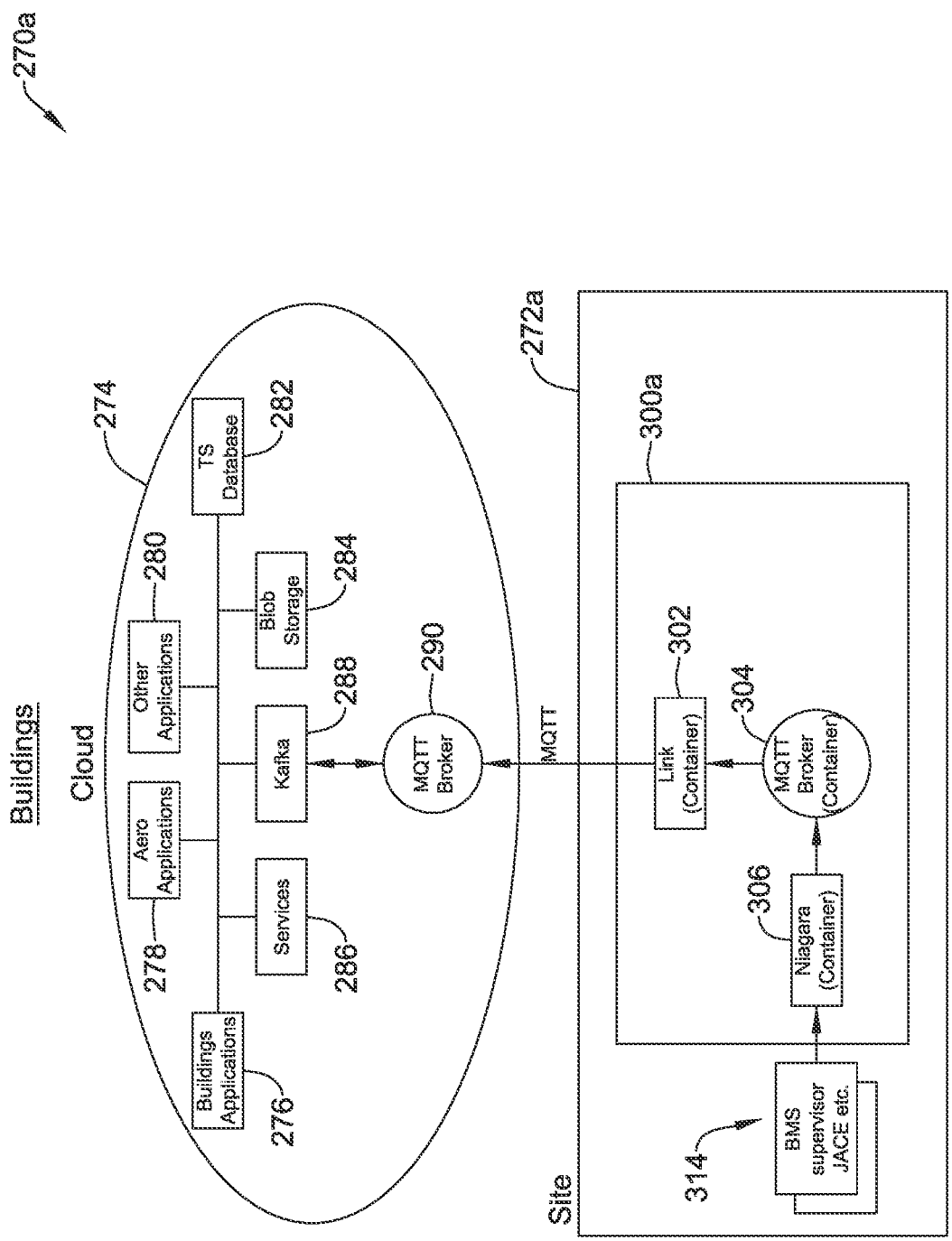
FIG. 17 is a schematic block diagram of an illustrative data management system comprising an edge controller customized for a building facility, in accordance with an example embodiment.

FIG. 17 shows an example of an illustrative data management system 270a customized for use in a building facility. The data management system 270a is quite similar to the data management system 270 but includes several changes at a site 272a. In particular, it can be seen that the Matrikon Dispatch container 308 is excluded within an edge gateway controller 300a as it is not used in this application. In this application, the Niagara framework container 306 is configured to receive data from one or more Building Management System (BMS) devices 314 over any of a variety of different network types.

Figure 18:
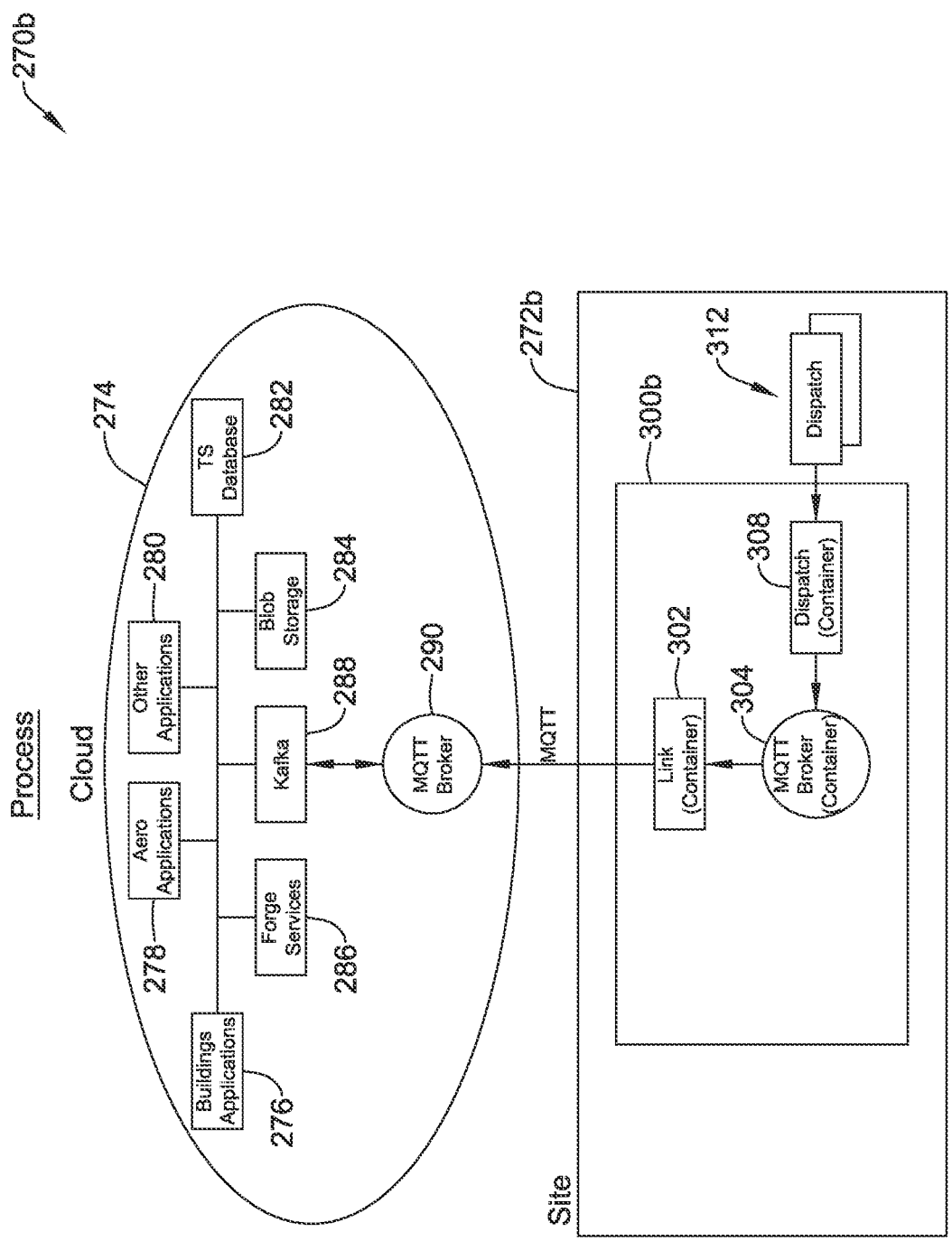
FIG. 18 is a schematic block diagram of an illustrative data management system comprising an edge controller customized for industrial process control, in accordance with an example embodiment.

FIG. 18 shows an example of an illustrative data management system 270b customized for use in process control. The data management system 270b is quite similar to the data management system 270 but includes several changes at a site 272b. In particular, it can be seen that the Niagara framework container 306 is excluded from an edge gateway controller 300b as it is not used in this application.

Figure 19:
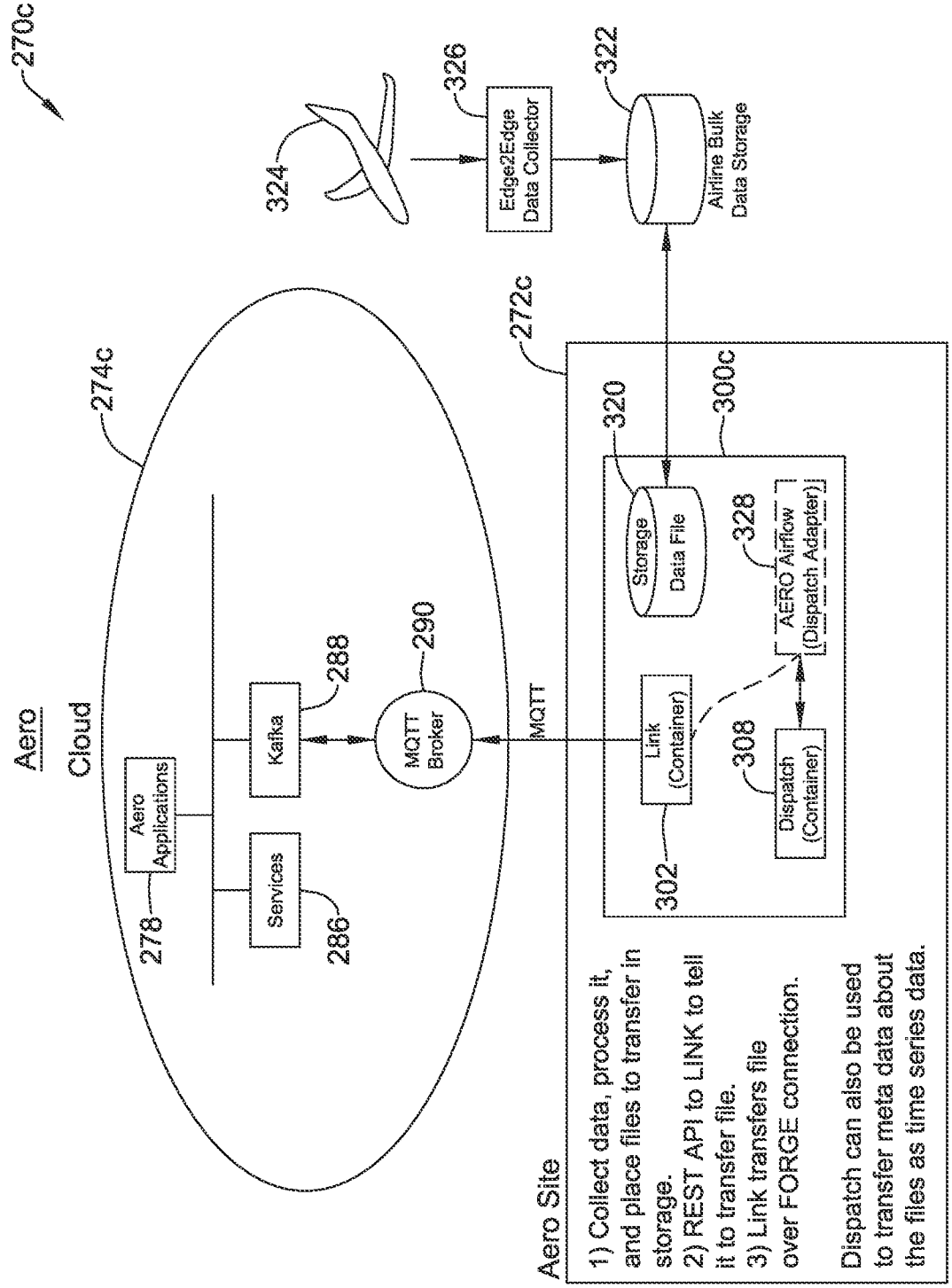
FIG. 19 is a schematic block diagram of an illustrative data management system comprising an edge controller customized for aerospace industry, in accordance with an example embodiment.

FIG. 19 shows an example of an illustrative data management system 270c customized for use in the aerospace industry (e.g. for an aircraft). The cloud 274c includes (as active modules) the Aero Applications module 278, the Services module 286, the Kafka module 288 and the MQTT Broker module 290. It will be appreciated that in some cases, the other features shown within the cloud 274 may not be absent but may simply not be utilized in aerospace applications. An edge gateway controller 300c includes several features not included in the edge gateway controller 300. This illustrated, for example, how the software containers downloaded to the edge gateway controller 300, 300c can be customized to accommodate the needs of a particular site 272, 272a, 272b, 272c.

The edge gateway controller 300c includes a storage module 320 that is configured to communicate with an Airline Bulk Data Storage module 322. The Airline Bulk Data Storage module 322 receives airplane maintenance and operational data from an airplane 324 through an Edge to Edge Data Collector 326. In some embodiments, the Airline Bulk Data Storage module 322 may receive substantial volumes of data from a particular airplane 324 at some point after the particular airplane 324 lands, rather than receiving data during flight. While a single airplane 324 is illustrated, it will be appreciated that a particular airline has tens, hundreds or even thousands of airplanes that are operational. It will also be appreciated that when even a single airplane 324 is operational, that single airplane 324 generates a prodigious amount of operational data. In some cases, the edge gateway controller 300c includes an AERO Airflow (dispatch adaptor) that sits between the Link container 302 and the Dispatch container 308.

Figure 20:
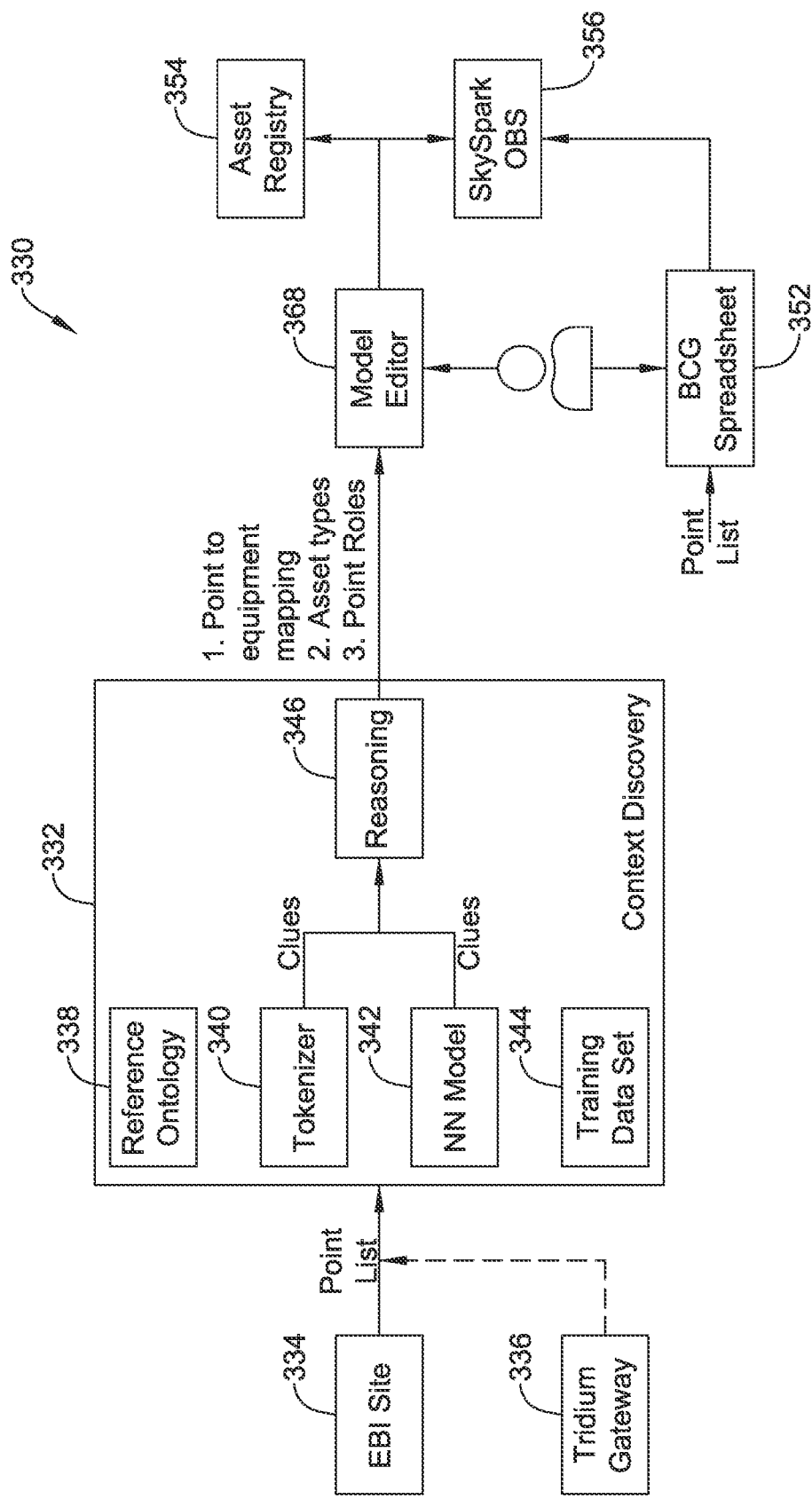
FIG. 20 is a schematic block diagram showing an illustrative context discovery process, in accordance with an example embodiment.

FIG. 20 is a schematic block diagram showing an illustrative context discovery process 330. According to an example embodiment, the context discovery is a process that can be performed to identify contextual information associated with the points (e.g. assets, equipment, sensors etc.) of a facility (e.g. buildings, industrial site etc.). For instance, in an example, the context discovery can include at least one of: (a) determining what points are available and identification information associated with the points; (b) determining what physical assets the points represent; (c) determining relationships (e.g. a data transaction relationship) amongst various points; and (d) an insight or context which can be identified for a point. As an example, while the facility 12 can have a number of local devices 20, 24 that are individually controlled by the controllers 22, 26 in some cases the local devices 20, 24 may not always be visible and/or accessible to the edge controller 16 and/or the cloud 14. In such cases, the edge controller 16 and/or the cloud 14 can only access an intermediary device (e.g. a master device or a master controllers) which can further access the end points. In this regard, in some example embodiments, by performing the context discovery, the edge controller 16 and/or the cloud 14 can identify the identity and contextual information associated with the end points based on performing a context discovery process on using the data received from and/or generated by the end-points. In some embodiments, there can be a distinction between asset types e.g. unitary controllers and plant controllers. For example, a unitary controller may control operation of a single associated device. A plant controller, in contrast, may control operation of several distinct devices. Accordingly, there is a need to be able to identify which points belong to which device in accordance with an asset type or asset class. Further, in some example scenarios, there can also be a requirement to determine which points (e.g. assets) within a facility are of interest, and which points are not of interest.

In some cases, the context discovery process can provide a solution to these requirements. According to an example embodiment, the edge controller 16 can perform the context discovery process. In an alternate embodiment, the context discovery process can be performed at the cloud 14. In yet another alterative embodiment, the context discovery function can be distributed among the edge controller 16, the cloud 14 and/or any other components or devices as desired.

In some example embodiments, the edge controller 16 can perform preparation of input data that is to be used for performing the context discovery process. In this regard, along with data polled from the end points, the edge controller 16 can aggregate and contextual information associated with the end points and/or the data transacted by the end points. Examples for deriving data from assets in constrained environments are described in U.S. Pat. No. 10,643,136, entitled—"SYSTEM FOR DERIVING DATA IN CONSTRAINED ENVIRONMENTS", filed on 27 Apr. 2015, which is incorporated herein by reference. In some examples, the contextual information identified by the edge controller 16 can be utilized for building a semantic model associated with a facility. In some examples, the semantic model can be utilized by the cloud 14 for performing data analytics (e.g., but not limited to, deriving various insights related to operation or asset condition in the facility). In an example embodiment, the context discovery process can provide identification of assets and formulation of a unified representation of the assets which can be further used for developing the semantic model for a facility (e.g. a building, an industrial facility etc.).

Typically, an organization or an OEM or an equipment supplier can use its own naming/nomenclating or defining a naming identifier for an asset and/or a point which is used for its identification within a network of assets. In other words, there can be different naming conventions or formats for the same asset and/or point used by different vendors or equipment suppliers. Accordingly, several assets (e.g. sensors, HVACs, sub-systems etc.) having a same asset type within a facility can be identified by different naming conventions. Said differently, in some examples, a naming convention adopted by a first equipment manufacturer for a same asset type (e.g. AHU) can be different from a naming convention used by a second equipment manufacturer.

In some cases, there can be different nomenclatures for naming a unitary type asset which can include a single electronic equipment (e.g. sensor) and another type asset can include more than one electronic equipment (e.g. sensor and a control valve). In some cases, an air handling unit (AHU) unit can be identified based on different names/labels by different third-parties (e.g. customers, vendors, or OEM suppliers). In this regard, in an example embodiment, regardless of different naming conventions, the context discovery process can enable identification of assets (e.g. the AHU unit) within a particular asset class in accordance with a unified or standard nomenclature by the edge controller 16 and/or the cloud 14. Further, the context discovery process can cater to identification of any asset type and the equipment associated to that asset type.

In some examples, an asset within a facility can either be a standalone equipment or may include more than one component. In some examples, various electronic components associated with a physical asset can be referred to as data points. In other words, while the electronic components are also physical assets, but for purpose of brevity, these electronic components can be referred to as data points through which the physical asset can pull or poll data. As an example, an AHU can be associated with a room temperature sensor and a cooling valve unit. In this example, by way of implementation of the context discovery process, the AHU can be identified as a physical asset and the room temperature sensor and the cooling valve can be identified as data points of the AHU. In an example, the context discovery process can enable identification of existing or potential relationships amongst various assets or end points. For instance, the context discovery process can identify that the room temperature sensor and the cooling valve unit and/or its respective operations or functioning is associated to the same AHU. In some example embodiments, the edge controller 16 can identify based on context discovery one or more physical assets (e.g. plant controllers, building controllers) and the electronic components that may be further coupled to the physical assets (e.g. sensors, valves etc.). The context discovery process can also enable identification of mapping (e.g. relationship or association) amongst the physical assets and the data points. According to various example embodiments described herein, the edge controller 16 can perform identification of a count of end points in accordance with each category of asset type by performing the context discovery. As an example, in an industrial facility, the edge controller 16 can identify multiple assets such as, a hot water plant which can further include multiple assets, e.g., but not limited to, first boiler, second boiler, first pump, second pump etc. In some example embodiments, the context discovery process can also enable identification of different asset types within a family of assets. For example, the context discovery process can enable identification of different controllers (e.g., but not limited to, a unitary controller, a plant controller) that may be present within a family of controllers located at a facility.

In an example embodiment, the context discovery process can be performed by the edge gateway controller 300. In an example, a method of context discovery can include performing a tokenization process to identify various electronic components and/or data points from an asset nomenclature (e.g. name of an asset). The tokenization process can include splitting the asset nomenclature (e.g. a tag name) into multiple sub-parts and identifying these sub-parts as individual electronic components or data points. The tokenization process can also include identification of relationships existing amongst the points. In an example, a facility can include a master asset e.g. a controller and multiple data points associated with the master asset. In this regard, the master asset can be identified higher in an asset hierarchy of the facility with respect to end points/other assets to which the master asset is associated. For example, the asset hierarchy can include a building system controller which can be communicatively coupled to various electronic components such as, HVAC subsystems, sensors, lighting sub-systems) etc. located within a facility. An example of tokenization process can be based on a TRIE algorithm that can include finding a tree of nodes in a network of nodes representing a tag name which includes a common identifiable portion of a point name (i.e. asset name). In some examples, tokenization includes identifying aspect values from a point row representative of a point name. More details of the TRIE algorithm for tokenization are described in U.S. patent application Ser. No. 13/912,682 and entitled—"SYSTEM AND METHOD TO CLASSIFY TELEMETRY FROM AUTOMATION SYSTEMS", which is incorporated herein by reference.

The illustrative context discovery process 330 includes a context discovery box 332 which receives a point list from, for example, either an EBI site 334 or a Tridium gateway 336. The illustrative context discovery box 332 includes a Reference Ontology 338, a Tokenizer 340, an NN Model 342 and a Training Data Set 344. In some examples, utilization of the NN model 342 in the context discovery process may include using a training dataset of point names and utilizing a neural network and/or machine learning to develop a model for identification of assets of the facility. The context discovery box 332 also includes a Reasoning block 346. The context discovery box 332 outputs from the Reasoning block 346 a point to equipment mapping, a list of asset types and a list of point roles. In some examples, the point roles may represent identification of a meaning of an end-point (e.g. a physical asset or data point) in a machine readable format. In some examples, the point roles may be associated with an aspect property which indicates a meaning of that point role and can have a finite list of values/attributes. For instance, in an example, a data point can represent an AHU which can have a point role such as, discharge air, i.e. that asset is functioned to discharge air from one point to another. Further, the point role discharge air can have aspect values such as signal type, temperature, air, etc. In some examples, there may or may not be a relationship between aspect properties for a point role. According to some example embodiments, the point role and the aspect types associated with an end point can be utilized in the context discovery process for identification of the asset. In some examples, the aspect values associated with the point role can be utilized by the edge controller 16 to filter and identify the data to be pulled from or transacted through the data point.

In accordance with some example embodiments, the output of the context discovery box 332 can be provided to a Model Editor 348. An engineer 350 provides information to the Model Editor 348 and to a BCG spreadsheet 352. The Model Editor 348 outputs to an Asset Registry 354 and a Sky Spark OBS 356. Additional details regarding identifying point roles are described in U.S. 2014/0032555, which application is incorporated herein by reference. In some case, the context discovery box 332 is configured to identify a type of device that is sending the data and/or how the device is connected to other devices in the system hierarchy from the context of the received data, such as the data syntax, point names referenced in the data, device names referenced in the data, data type referenced in the data, quality of the received data and/or any other suitable information. A further description of an illustrative context discovery method and system is included in the U.S. Provisional Patent Application Ser. No. U.S. 63/137,302, and entitled "CONTEXT DISCOVERY SYSTEM AND METHOD", which is incorporated herein by reference.

Figure 21:
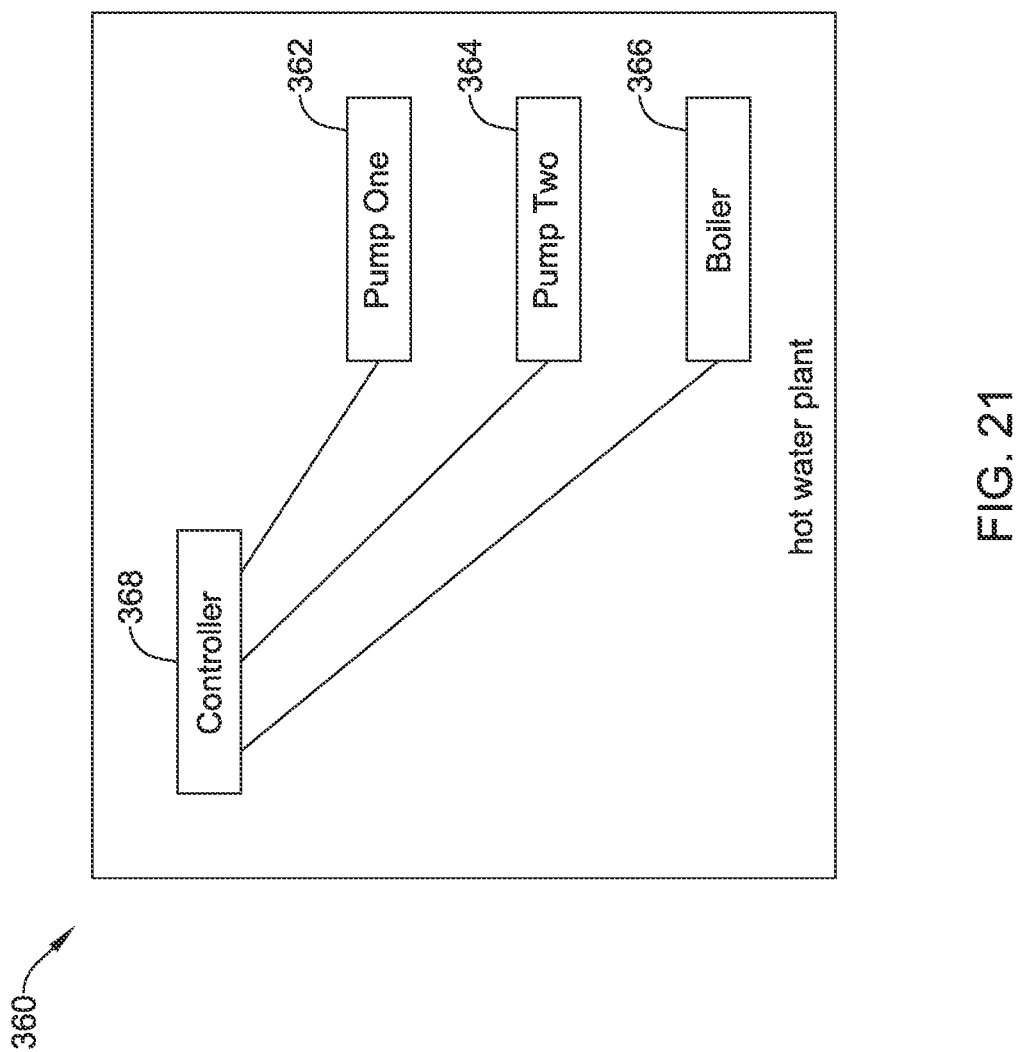
FIG. 21 is a schematic block diagram showing an example scenario of a hot water plant of an industrial site managed by an edge controller, in accordance with an example embodiment.

FIG. 21 is a schematic block diagram showing an example scenario of a hot water plant 360 of an industrial site managed by an edge controller, in accordance with an example embodiment. The hot water plant 360 includes a Pump One labeled as 362 and a Pump Two labeled as 364. The hot water plant 360 also includes a Boiler 366. A controller 368 controls the operation of the Pump One labeled as 362, the Pump Two labeled as 364 and the Boiler 366. In accordance with an example embodiment, the controller 368 can correspond to the edge controller 16, 68 and can perform operations Accordingly, the controller 368 can be considered as being a plant controller. In an example embodiment, the controller 368 can perform a context discovery operation on the data pulled from the various assets of the hot water plant 360. Based on the operation, the controller 368 can determine, for example, but not limited to, (i) a list of points associated with the controller 368, (ii) which of those points correspond to telemetry data from the Pump One labeled as 362, (iii) which of those points correspond to telemetry data from the Pump Two labeled as 364 and (iv) which of those points correspond to telemetry data from the Boiler 366. Further, the controller 362 can normalize the data to develop a common object model and/or upload the data selectively to a server (e.g. the cloud 14). Furthermore, as described herein, the controller 368 can also selectively manage operations and/or data transactions related to the points of the hot water plant 360 based on configuration information received from the server.

Figure 22:
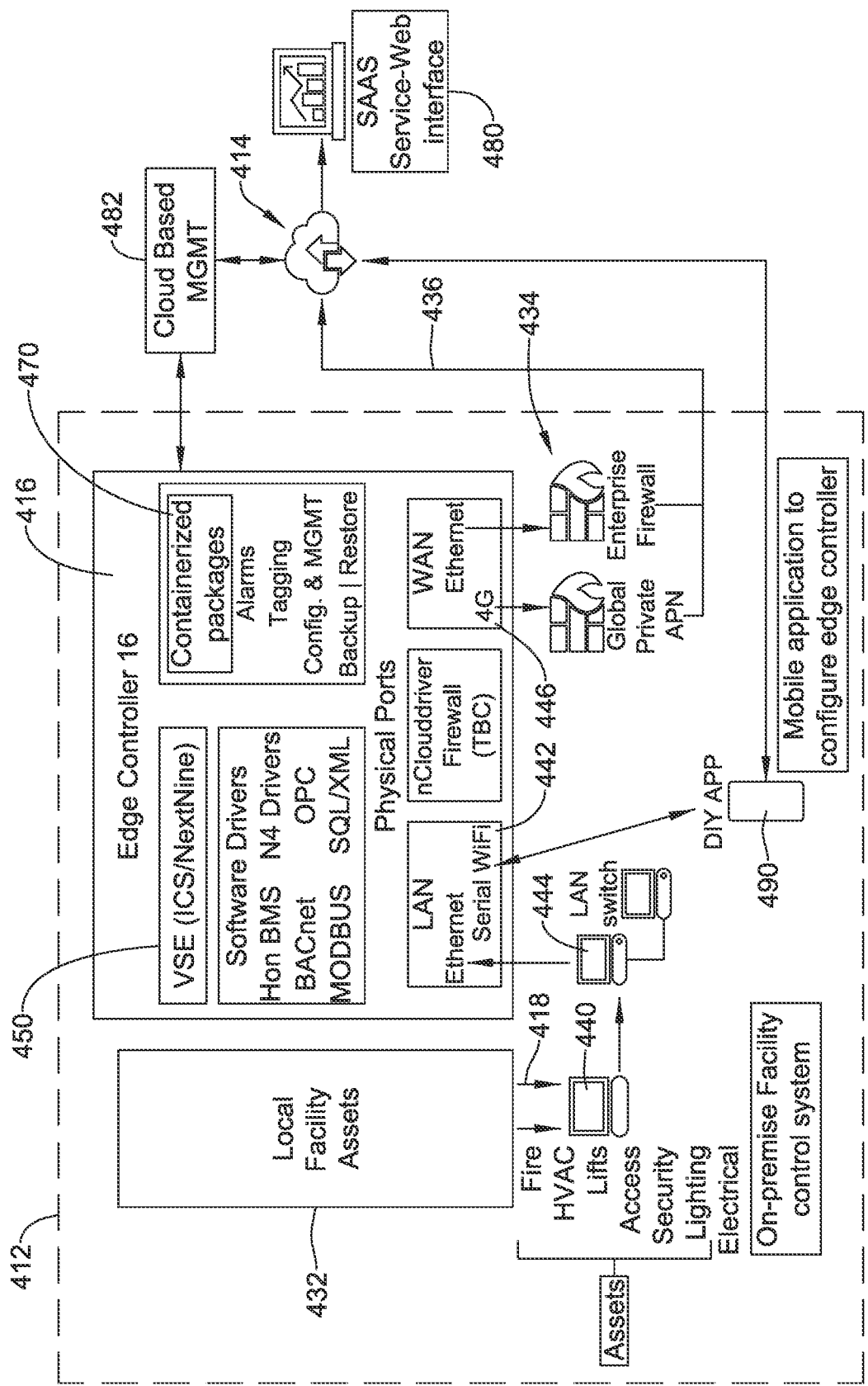
FIG. 22 is a schematic block diagram showing an illustrative facility in accordance with an example embodiment.

FIG. 22 is a schematic block diagram showing an illustrative facility 412 in accordance with an example embodiment. The illustrative facility 412 includes one or more local facility assets 432. The local facility assets 432 may include one or more local devices such as HVAC devices, access control devices, security devices, lighting devices, fire system devices, lift devices (e.g. elevator/escalator devices), and/or other electrical and/or control devices. In some cases, the local facility assets 432 may be part of a Building Management System (BMS) that services the facility 412. In some cases, the facility 412 may include one or more networks such as the local network 418 and an on-premise facility control system 440. The on-premise facility control system 440 may interface with and provide supervisory control over at least some of the local facility assets 432 of the facility 412 via the local network 418.

In an embodiment, an edge controller 416 is installed at the facility 412 such that the edge controller 416 is able to learn the identity and features of each of the facility assets 432 (and on-premises facility control system 440) and is able to oversee operation of one or more of the facility assets 432, sometimes through the on-premise facility control system 440. In an embodiment, the edge controller 416 has one or more LAN ports 442 for communicating with the local facility assets 432, sometimes through the on-premise facility control system 440. In some cases, one or more LAN switches/routers 444 are provided to provide an interface between one or more of the LAN ports 442 of the edge controller 416 and a LAN that connected to one or more of the facility assets 432 sometimes through the on-premise facility control system 440.

In an example embodiment, the edge controller 416 is configured to transact the data received from the local facility assets 432 up to the cloud 414 through a secured communication channel (e.g. a VPN tunnel). In an example embodiment, the edge controller 416 includes one or more WAN ports 446, such as an Ethernet port and/or a cellular port (e.g. 4G). A firewall 434 is positioned between the facility 412 and the Internet 436. Communications between the edge controller 416 and cloud 414 may pass through the firewall 434.

In some embodiments, as will be discussed, the edge controller 416 may include a cellular capability such as a 4G cellular port that allows the edge controller 416 to communicate with assets that are exterior to the facility 412 before access through the firewall 434 has been granted or otherwise enabled by the IT staff at the facility. When so provided, the cellular port may gain access to the cloud 414 through a global private Access Point Name (APN) connection as shown. This may allow the setup, configuration and/or operation of the edge controller 416 before access through the firewall 434 has been granted or otherwise enabled by the IT staff at the facility, which can significantly reduce the setup time of the system.

It is contemplated that the edge controller 416 may execute a cybersecurity management block 450, which in some cases may be a virtual security engine (VSE) based on the ICS Shield™ product available from Honeywell International Inc. ICS Shield™ provides a top-down operational technology (OT) security management solution for securing connected industrial control system (ICS) environments with multiple physical sites and multiple automation equipment types. It also enables secure management of remote field assets through a single security operations center.

The edge controller 416 may also host a number of software drivers 462. The software drivers 462 may include, for example, BMS drivers such as BACnet and MODBUS for communicating with and in some cases auto discovering the facility assets 432 in the facility 412. The software drivers 462 may include other drivers such as Niagara™ drivers (N4 drivers) for communicating with, for example, a Java Application Control Engine (JACE) of a Niagara™ BMS framework available from the Tridium Corporation. It is contemplated that the software drivers 462 may include OPC, SQL/XML and/or any other suitable drivers.

In some cases, the edge controller 416 is configured to support one or more containerized packages 470. These containerized packages 470 can include one or more applications, drivers, firmware's, executable files, services etc., that can be configured based on configuration information from the cloud 414. These containerized packages 470 can generate alarms, tag certain data collected from the local facility assets 432, generate metadata from the data collected from local facility assets 432, filter data collected from the local facility assets 432, normalize certain data collected from the local facility assets 432, and perform configuration, management, backup and restore functions of the edge controller 16. These are just example functions that may be supported by the containerized packages 470 of the edge controller 416.

In some cases, the containerized packages 470 supported at the edge controller 416 can pull telemetry data and/or model data from the one or more of the local facility assets 432 in the facility 412. Further, in accordance with some example embodiments, the edge controller 416 utilizes the containerized packages 470 to perform one or more operations corresponding to at least one of: data ingress, data normalization and/or data aggregation, and data egress, as described further herein. Furthermore, the containerized packages 470 can be configured to control one or more operations associated with the local facility assets 432 of the facility 412, sometimes through the on-premise facility control system 440.

In accordance with some example embodiments, the containerized packages 470 can include or implement one or more of the software drivers 462 mentioned above. The software drivers 462 can, for example, auto-discover and identify one or more the local facility assets 432 of the facility 412, sometimes through or using the on-premise facility control system 440. In this regard, the containerized packages 470 can enable the edge controller 416 to access the local facility assets 432, identify the one or more local facility assets 432 based on the interrogation of the local facility assets 432, and configure one or more data transaction capabilities of the local facility assets 432. The data transaction capability referred to herein can indicate, for example, what data is to be pulled from a particular asset and/or how frequent data is to be pulled from the particular asset, and/or what metadata is to be pulled from the particular asset. In some cases, the containerized packages 470 can be utilized to configure at least one of: (a) a selection of data which is to be pulled from an asset; (b) a frequency at which the data is to be pulled from an asset; (c) selection of an asset from amongst the multiple assets from which the data is to be requested by the edge controller 416; and (d) a selection of metadata associated with an asset which is to be requested by the edge controller 416. In an example embodiment, a containerized package 470 at the edge controller 416 can include one or more of: drivers, native firmware, library files, application file, and/or executable files that can enable one or more functions as described herein, with respect to the edge controller 16.

According to some example embodiments, the containerized packages 470 can be configured to pull the data from the local facility assets 432 onto the edge controller 416 by sending data interrogation requests to various local facility assets 432. These data interrogation requests can be defined in a format in accordance with a network protocol supported by the particular asset(s). Typically, various local facility assets 432 of a facility 412 may support different network protocols (e.g. IOT based protocols like BACnet, Modbus, Foxs, OPC UA, Obix, SNMP, MQTT etc.). In some example embodiments, the containerized packages 470 are customizable and user-configurable so as to cater to any type of asset supported by any network protocol. In other words, the containerized packages 470 can be configured to pull the data and/or the metadata from various local facility assets 432 regardless of the type of asset and/or the underlying network protocol for communication with the asset. In some cases, the edge controller 416 supports one or more containerized packages 470 that can cause automatic discovery and identification of local facility assets 432 of various subsystems in a facility 412 regardless of an asset type (e.g. modern sub-system or legacy sub-system, OEM manufactured, native asset etc.). An example of containerized packages 470 of the edge controller 416 and its associated operations are further described herein and in particular with respect to FIG. 5.

In some cases, the cloud 414 is configured to analyze at least some of the data collected by the cloud 414 and provide control commands back to the facility 412 based on the analysis. In some cases, this analysis may be offered as part of a Software-As-A-Service (SAAS). A remote web interface 480 may be used to provide an interface to the cloud 414. The remote web interface 480 may be used to, for example, monitor the data collected by the cloud 414, configure the cloud 414 to perform certain functions for a particular facility 412 (e.g. as a SAAS), and configure the edge controller 416 to perform certain functions (such as download certain containerized packages tailored to a particular facility 412). These are just some examples. In the example shown, a cloud-based management block 482 provides an interface between the cloud 414 and the edge controller 416 that, for example, a remote technician can interact with the edge controller 416, often through the cloud 414. In some cases, the cloud 414 may include a mobile device on-boarding block, which permits a user to use their smartphone or other mobile device 490 to perform at least some of the tasks involved in setting up and configuring the edge controller 416, as shown in for example FIG. 23.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, may be described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical, and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

The foregoing method descriptions and the process flow diagrams are provided merely as illustrative examples and are not intended to require or imply that the steps of the various embodiments must be performed in the order presented. Words such as "thereafter," "then," "next," etc., when used, are not intended to limit the order of the steps unless the context clearly indicates otherwise; these words are simply used to guide the reader through the description of the methods.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary. The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

ADDITIONAL EXAMPLES

Example 1. An edge controller, the edge controller comprising:
  a network communication port, the network communication port communicating with the remote server through a gateway at the local facility when the network communication port is activated;
  a cellular communication port, the cellular communication port communicating with the remote server through a cellular communication network when the cellular communication port is activated;

a device communication port, the device communication port communicating with one or more of the local devices at the local facility;

a controller operatively coupled to the network communication port, the cellular communication port and the device communication port, the controller:

receiving configuration information over the cellular communication port; and installing the received configuration information on the edge controller, wherein the installed configuration information configures the controller of the edge controller to obtain the device data from the one or more local devices and to send a representation of at least some of the device data to the remote server.

Example 2. An edge controller for obtaining device data from one or more local devices at a local facility and providing a representation of at least some of the device data to a remote server, the edge controller comprising:

a network communication port for communicating with the remote server through a gateway at the local facility;

a cellular communication port for communicating with the remote server through a cellular communication network;

a device communication port for communicating with one or more of the local devices at the local facility;

a controller operatively coupled to the network communication port, the cellular communication port and the device communication port, the controller is configured to:

receive configuration information over the cellular communication port; and install the received configuration information on the edge controller, wherein the installed configuration information configures the controller of the edge controller to obtain the device data from the one or more local devices and to send a representation of at least some of the device data to the remote server.

Example 3. The edge controller of any preceding Example, wherein the controller further includes control logic that is configured to at least selectively provide closed loop control over a function of one or more of the local devices and is configured to receive and execute control commands provided by the remote server for controlling one or more of the local devices.

Example 4. The edge controller of any preceding Example, wherein the controller is further configured to receive device set points provided by the remote server for controlling operation of one or more of the local devices.

Example 5. The edge controller of any preceding Example, wherein the configuration information, once installed, configures the controller to establish communication with the remote server via the network communication port.

Example 6. The edge controller of any preceding Example, wherein the configuration information comprises one or more commands, and the controller is configured to execute the one or more commands.

Example 7. The edge controller of any preceding Example, wherein the configuration information defines at least in part the representation of at least some of the device data that is sent to the remote server.

Example 8. The edge controller of Example 7, wherein the device data obtained from the local devices comprises a plurality of data items each having a data item format, and wherein the configuration information defines which of the plurality of data items are used in constructing the representation of at least some of the device data that is sent to the remote server.

Example 9. The edge controller of any one of Examples 7 or 8, wherein the configuration information defines a data format for the representation of at least some of the device data that is sent to the remote server.

Example 10. The edge controller of any one of Examples 7 to 9, wherein the configuration information defines one or more local data analytics executed by the controller to generate the representation of at least some of the device data that is sent to the remote server.

Example 11. The edge controller of any preceding Example, wherein the edge controller determines that WiFi connectivity is available, and in accordance with a determination that WiFi connectivity is available, the edge controller activates the network communication port.

Example 12. The edge controller of Example 11, wherein in accordance with the determination that WiFi connectivity is available, the edge controller deactivates the cellular communication port.

Example 13. The edge controller of any of Examples 11 or 12, wherein the edge controller makes a determination that WiFi connectivity is available comprises detecting that a firewall port has been opened and made available to the edge controller.

Example 14. A method for obtaining device data using an edge controller from one or more local devices at a local facility and providing a representation of at least some of the device data to a remote server, the method comprising:

receiving configuration information at the edge controller;

installing the received configuration information on the edge controller, wherein the installed configuration information configures the edge controller to obtain the device data from the one or more local devices and to send a representation of at least some of the device data to the remote server;

once the received configuration information is installed on the edge controller, the edge controller obtaining the device data from the one or more local devices and sending a representation of at least some of the device data to the remote server; and the edge controller at least selectively providing closed loop control over a function of one or more of the local devices and receiving and executing control commands provided by the remote server for controlling one or more of the local devices.

Example 15. The method of Example 14, wherein the configuration information is received at the edge controller over a cellular communication port of the edge controller.

Example 16. The method of any one of Examples 14 or 15, wherein the representation of at least some of the device data is sent to the remote server through a gateway at the local facility.

Example 17. The method of any one of Examples 14 to 16, wherein the edge controller implements a virtual controller, wherein the virtual controller includes one or more virtual containers or virtual machines, and wherein the virtual controller is defined by a virtual controller image, and wherein the configuration information includes the virtual controller image.

Example 18. A method of remotely obtaining data from a resource located at a resource site, the resource operably coupled with an edge controller disposed at the resource site that is itself operably coupled with a local network, the edge controller including a cellular connectivity feature, the method comprising:

using the cellular connectivity feature of the edge controller to establish a connection between the edge controller and a remote server that is remote from the resource site and to download one or more software packages to the edge controller, the one or more software packages executable by the edge controller;

executing the one or more software packages by the edge controller, resulting in the edge controller retrieving data from the resource site;

the edge controller performing analytics on the retrieved data, resulting in a data analytics output; and uploading the data analytics output to a remote computing device that is remote from the edge controller.

Example 19. The method of Example 18, further comprising:

the edge controller selectively providing closed loop control over a function of one or more of the local devices and receiving and executing control commands provided by the remote server for controlling one or more of the local devices.

Example 20. The method of Example 19, further comprising:

the remote computing device, responsive to receiving the data analytics output, determining one or more set point values in order to optimize one or more parameters, the control commands including the one or more set point values.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in detail, particularly in matters of shape, size, arrangement of parts, and exclusion and order of steps, without exceeding the scope of the disclosure. The disclosure's scope is, of course, defined in the language in which the appended claims are expressed.

What is claimed is:

1. An edge controller for providing an interface between a plurality of physical assets of a facility and a cloud server, the edge controller comprising:

one or more communication ports for communicating with a plurality of physical assets in the facility and the cloud server;

a controller operatively coupled to the one or more communication ports, the controller configured to:

receive first telemetry data and/or first metadata from a first asset of the plurality of physical assets of the facility via the one or more communication ports;

transform the first received telemetry data and/or first metadata, into transformed data, the transformed data having a unified data format in accordance with a common object model;

send at least a portion of the transformed data to the cloud server based on one or more process parameters required by the cloud server for one or more operations; and determine, based on data-processing of the portion of the transformed data, a second asset of the plurality of assets from which second telemetry data and/or second metadata is to be received at the edge controller in a subsequent data transaction;

receiving a configuration information for the second asset from the cloud server based at least on the data-processing of the portion of the transformed data; and controlling an operation of the second asset based on the configuration information.

2. The edge controller of claim 1, wherein the controller is configured to receive first telemetry data from one or more of the plurality of physical assets, wherein the first telemetry data comprises time-series data including a plurality of data values collected over time.

3. The edge controller of claim 1, wherein transforming the first received telemetry data and/or first metadata comprises one or more of:

normalizing at least some of the received first telemetry data and/or first metadata;

transforming at least some of the received first telemetry data and/or first metadata from a first format into a second format that supports the common object model; and aggregating at least some of the received first telemetry data and/or first metadata from one or more of the plurality of physical assets.

4. The edge controller of claim 3, wherein normalizing at least some of the received first telemetry data and/or first metadata comprises normalizing at least some of the received first telemetry data and/or first metadata based on a common unit of measure.

5. The edge controller of claim 3, wherein aggregating at least some of the received first telemetry data and/or first metadata comprises averaging at least some of the received first telemetry data and/or metadata.

6. The edge controller of claim 1, wherein the controller is configured to:

determine based on data processing using the common object model, one of a portion of the second telemetry data and/or the second metadata that is available from the plurality of physical assets is to be received by the edge controller; and/or determine one of the portion of the transformed data that is to be sent to the cloud server.

7. The edge controller of claim 1, wherein the common object model is compatible with one or more data analytics application or service supported by the cloud server.

8. The edge controller of claim 1, wherein the first metadata, when received, comprises ancillary or contextual information associated with the corresponding physical asset.

9. The edge controller of claim 8, wherein the first metadata comprises one or more of:

a geographical location of the corresponding physical asset within the facility;

a configuration setting of the corresponding physical asset;

a data type and/or data format associated data provided by the corresponding physical asset; and a relationship between the corresponding physical asset and one or more other physical assets in the facility.

10. The edge controller of claim 1, wherein the controller is further configured to discover and identify at least some of the plurality of physical assets communicatively coupled to the edge controller.

11. The edge controller of claim 1, wherein the controller is configured to:

receive first telemetry data and/or first metadata from each of two or more of the plurality of physical assets in a format or data structure that is in accordance with a communication protocol between the edge controller and the corresponding physical asset.

12. The edge controller of claim 1, wherein the controller executes one or more containerized packages that are configured based on configuration information from the cloud server, wherein the one or more containerized packages:
- determine the set of assets from amongst the plurality of assets from which the first telemetry data and/or the first metadata is to be received at the edge controller in the subsequent data transaction;
- determine which and/or when first telemetry data and/or first metadata that is available from the plurality of physical assets is received by the edge controller;
- determine how the received first telemetry data and/or first metadata is transformed into transformed data having the unified data format in accordance with the common object model; and/or
- determine which of the transformed data is sent to the cloud server.

13. A non-transitory computer readable medium storing instructions thereon that when executed by one or more processors, cause the one or more processors to:
- receive first telemetry data and/or first metadata from a first asset of a plurality of physical assets;
- transform the received first telemetry data and/or first metadata into transformed data, the transformed data having a unified data format in accordance with a common object model;
- send at least a portion of the transformed data to a cloud server based on one or more process parameters required by the cloud server for one or more operations; and
- determine, based on data-processing of the portion of the transformed data, a second asset of the plurality of assets, from which second telemetry data and/or the second metadata is to be received at the edge controller in a subsequent data transaction;
- receive a configuration information for the second asset from the cloud server based at least on the data-processing of the portion of the transformed data; and
- control an operation of the second asset based on the configuration information.

14. The non-transitory computer readable medium of claim 13, wherein the instructions cause the one or more processors to transform the received telemetry data and/or metadata by one or more of:
- normalizing at least some of the received first telemetry data and/or first metadata;
- transforming at least some of the received first telemetry data and/or first metadata from a first format into a second format that supports the common object model; and
- aggregating at least some of the received first telemetry data and/or first metadata from one or more of the plurality of physical assets.

15. The non-transitory computer readable medium of claim 13, wherein the instructions cause the one or more processors to:
- determine based on data-processing using the common object model, one of a portion of the second telemetry data and/or the second metadata that is available from the plurality of physical assets is to be received; and/or
- determine the portion of the transformed data that is to be sent to the cloud server.

* * * * *